(12) United States Patent
Chen et al.

(10) Patent No.: US 11,816,300 B2
(45) Date of Patent: Nov. 14, 2023

(54) TOUCH APPARATUS

(71) Applicant: AUO Corporation, Hsinchu (TW)

(72) Inventors: Chieh-Ming Chen, Hsinchu (TW); Bo-Ru Jian, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/167,890

(22) Filed: Feb. 13, 2023

(65) Prior Publication Data

US 2023/0195271 A1    Jun. 22, 2023

Related U.S. Application Data

(63) Continuation of application No. 17/502,035, filed on Oct. 14, 2021, now Pat. No. 11,620,026.

(60) Provisional application No. 63/110,422, filed on Nov. 6, 2020.

(30) Foreign Application Priority Data

Apr. 19, 2021   (TW) .................................. 110113983

(51) Int. Cl.
G06F 3/044    (2006.01)
G06F 3/041    (2006.01)

(52) U.S. Cl.
CPC .......... G06F 3/0446 (2019.05); G06F 3/0412 (2013.01)

(58) Field of Classification Search
CPC ......... G06F 2203/04112; G06F 3/0412; G06F 3/0446
See application file for complete search history.

(56) References Cited

U.S. PATENT DOCUMENTS

2019/0008040 A1\* 1/2019 Nakamura ........... H05K 1/0296

\* cited by examiner

Primary Examiner — Robin J Mishler
(74) Attorney, Agent, or Firm — JCIPRNET

(57) ABSTRACT

A touch apparatus includes first touch electrodes and second touch electrodes. The first touch electrodes and the second touch electrodes are interlaced, so as to define first interlaced regions. Each of the first touch electrodes includes first main portions extended in a first direction and second main portions extended in a second direction. The first main portions and the second main portions are crossed, so as to form first grids. Each of the first touch electrodes further includes first branches crossed with two segments of two adjacent first main portions of at least one of the first grids.

10 Claims, 20 Drawing Sheets

TOUCH APPARATUS

CROSS-REFERENCE TO RELATED APPLICATION

This application is a continuation application of and claims the priority benefit of U.S. application Ser. No. 17/502,035, filed on Oct. 14, 2021, which claims the priority benefit of U.S. application Ser. No. 63/110,422, filed on Nov. 6, 2020, and Taiwan application serial no. 110113983, filed on Apr. 19, 2021. The entirety of each of the above-mentioned patent applications is hereby incorporated by reference herein and made a part of this specification.

BACKGROUND OF THE INVENTION

Field of the Invention

The invention relates to an electronic apparatus, and more particularly, to a touch apparatus.

Description of Related Art

A touch apparatus (such as a touch panel) has the advantages of convenient operation, and therefore is widely installed in electronic products (such as mobile phones, tablet computers, electronic blackboards, etc.) The touch apparatus includes a plurality of first touch electrodes and a plurality of second touch electrodes interlaced with each other. Based on the consideration of visual effects, generally, the first touch electrodes and the second touch electrodes are mostly designed as transparent sensing patterns. The resistance of the transparent sensing patterns is high, which is not conducive to the electrical properties of the touch apparatus. Therefore, mesh-shaped first touch electrodes and second touch electrodes made of low-resistance materials (such as metals) have been developed.

Compared with transparent sensing patterns, the mesh-shaped first touch electrodes and second touch electrodes are more suitable for application in a large-size touch apparatus (such as an electronic blackboard, etc.) A fringe-induced electric field may be formed between the first touch electrodes and the second touch electrodes to detect whether there is a conductive object (such as but not limited to: a finger, a stylus, etc.) in contact with or approaching the touch surface. Generally, in a large-size touch apparatus, the distance between the touch surface and the first touch electrodes and the second touch electrodes is greater, so that the lines of force of the fringe-induced electric field have insufficient distribution density on the touch surface, thus affecting the performance of the touch apparatus.

SUMMARY OF THE INVENTION

The invention provides a touch apparatus with good performance.

A touch apparatus of an embodiment of the invention includes a plurality of first touch electrodes and a plurality of second touch electrodes. Each of the first touch electrodes includes a plurality of first main portions, a plurality of second main portions, a plurality of first branches, and a plurality of second branches. The plurality of first main portions are substantially extended in a first direction. The plurality of second main portions are substantially extended in a second direction, wherein the first direction is staggered with the second direction, the plurality of first main portions and the plurality of second main portions are crossed to form a plurality of first grids, and each of the first grids is defined by two segments of two adjacent first main portions and two segments of two adjacent second main portions. The plurality of first branches are structurally separated from each other, wherein the plurality of first branches and the two segments of the two adjacent first main portions of at least one first grid of the plurality of first grids are crossed. The plurality of second branches are structurally separated from each other, wherein the plurality of second branches and the two segments of the two adjacent second main portions of at least one first grid of the plurality of first grids are crossed. The plurality of second touch electrodes and the plurality of first touch electrodes are interlaced, so as to define a plurality of first interlaced regions. The plurality of first branches and the plurality of second branches of the plurality of first touch electrodes are located at least in the plurality of first interlaced regions.

A touch apparatus of an embodiment of the invention includes a plurality of first touch electrodes, a plurality of first dummy electrodes, a plurality of second touch electrodes, and a plurality of second dummy electrodes. Each of the first dummy electrodes is disposed between two adjacent first touch electrodes. Each of the second dummy electrodes is disposed between two adjacent second touch electrodes. The plurality of first touch electrodes and the plurality of second touch electrodes are interlaced with each other, so as to define a plurality of first interlaced regions. The plurality of first touch electrodes and the plurality of second dummy electrodes are interlaced, so as to define a plurality of second interlaced regions. The plurality of second touch electrodes and the plurality of first dummy electrodes are interlaced, so as to define a plurality of third interlaced regions. Each of the first touch electrodes includes a plurality of first main portions extended in a first direction and a plurality of second main portions extended in a second direction. The first direction and the second direction are staggered. The plurality of first main portions and the plurality of second main portions are crossed, so as to form a plurality of first grids. Each of the first grids is defined by two segments of two adjacent first main portions and two segments of two adjacent second main portions. A number density of the plurality of first grids on a second interlaced region is greater than a number density thereof on a first interlaced region.

In an embodiment of the invention, in a top view of the touch apparatus, the plurality of first branches and the plurality of second branches of each of the first touch electrodes are separated from the plurality of second touch electrodes.

In an embodiment of the invention, the display apparatus further includes a plurality of first dummy patterns. The plurality of first dummy patterns are respectively disposed in the plurality of first grids and separated from the plurality of first touch electrodes. Each of the first dummy patterns includes a first portion and a second portion. The first portion is arranged in the first direction with two second branches on a corresponding first grid, and structurally separated from the two second branches. The second portion is crossed with the first portion, arranged in the second direction with two first branches on the corresponding first grid, and structurally separated from the two first branches.

In an embodiment of the invention, there is a first distance between the first portion of each of the first dummy patterns and one of the two second branches on the corresponding first grid, and the first distance is less than or equal to 8 μm.

In an embodiment of the invention, there is a second distance between the second portion of each of the first dummy patterns and one of the two first branches on the corresponding first grid, and the second distance is less than or equal to 8 µm.

In an embodiment of the invention, a linewidth of at least one of a first main portion of the first touch electrode, a second main portion of the first touch electrode, a first branch of the first touch electrode, a second branch of the first touch electrode, a first portion of a first dummy pattern, and a second portion of the first dummy pattern is less than or equal to 8 µm.

In an embodiment of the invention, a first branch of the first touch electrode includes a first portion and a second portion respectively located at two opposite sides of a corresponding first main portion, and a length of the first portion of the first branch is different from a length of the second portion of the first branch.

In an embodiment of the invention, a second branch of the first touch electrode includes a first portion and a second portion respectively located at two opposite sides of a corresponding second main portion, and a length of the first portion of the second branch is different from a length of the second portion of the second branch.

In an embodiment of the invention, each of the second touch electrodes includes a plurality of third main portions, a plurality of fourth main portions, a plurality of third branches, and a plurality of fourth branches. The plurality of third main portions are substantially extended in the first direction. The plurality of fourth main portions are substantially extended in the second direction, wherein the plurality of third main portions and the plurality of fourth main portions are crossed to form a plurality of second grids, and each of the second grids is defined by two segments of two adjacent third main portions and two segments of two adjacent fourth main portions. The plurality of third branches are structurally separated from each other, wherein the plurality of third branches and the two segments of the two adjacent third main portions of at least one second grid of the plurality of second grids are crossed. The plurality of fourth branches are structurally separated from each other, wherein the plurality of fourth branches and the two segments of the two adjacent fourth main portions of at least one second grid of the plurality of second grids are crossed. The plurality of third branches and the plurality of fourth branches of the plurality of second touch electrodes are located at least in the plurality of first interlaced regions.

In an embodiment of the invention, in a top view of the touch apparatus, the plurality of third branches and the plurality of fourth branches of each of the second touch electrodes are separated from the plurality of first touch electrodes.

In an embodiment of the invention, the display apparatus further includes a plurality of second dummy patterns. The plurality of second dummy patterns are respectively disposed in the plurality of second grids and separated from the plurality of second touch electrodes. Each of the second dummy patterns includes a third portion and a fourth portion. The third portion is arranged in the first direction with two fourth branches on a corresponding second grid, and structurally separated from the two fourth branches. The fourth portion is crossed with the third portion, arranged in the second direction with two third branches on the corresponding second grid, and structurally separated from the two third branches.

In an embodiment of the invention, there is a third distance between the third portion of each of the second dummy patterns and one of the two fourth branches on the corresponding second grid, and the third distance is less than or equal to 8 µm.

In an embodiment of the invention, there is a fourth distance between the fourth portion of each of the second dummy patterns and one of the two third branches on the corresponding second grid, and the fourth distance is less than or equal to 8 µm.

In an embodiment of the invention, a linewidth of at least one of a third main portion of the second touch electrode, a fourth main portion of the second touch electrode, a third branch of the second touch electrode, a fourth branch of the second touch electrode, a third portion of a second dummy pattern, and a fourth portion of the second dummy pattern is less than or equal to 8 µm.

In an embodiment of the invention, in a top view of the touch apparatus, a plurality of first main portions of the plurality of first touch electrodes, a plurality of first portions of the plurality of first dummy patterns, a plurality of third main portions of the plurality of second touch electrodes, and a plurality of third portions of the plurality of second dummy patterns are arranged at a pitch, the pitch is P1, first portion of a first branch of a first touch electrode is located at a side of a corresponding first main portion, a length of the first portion of the first branch is a1, and $0.25 \cdot P1 \leq a1 \leq 0.75 \cdot P1$.

In an embodiment of the invention, each of the second touch electrodes includes a plurality of third main portions and a plurality of fourth main portions. The plurality of third main portions are substantially extended in the first direction. The plurality of fourth main portions are substantially extended in the second direction, wherein the plurality of third main portions and the plurality of fourth main portions are crossed to form a plurality of second grids. In a same first interlaced region, a number density of the plurality of second grids is greater than a number density of the plurality of first grids.

In an embodiment of the invention, a width of one of the plurality of first grids on the first interlaced region is greater than a width of another of the plurality of first grids on the second interlaced region.

In an embodiment of the invention, each of the first touch electrodes further includes a plurality of first branches and a plurality of second branches. The plurality of first branches are structurally separated from each other, wherein the plurality of first branches and the two segments of the two adjacent first main portions of at least one first grid of the plurality of first grids are crossed. The plurality of second branches are structurally separated from each other, wherein the plurality of second branches and the two segments of the two adjacent second main portions of at least one first grid of the plurality of first grids are crossed. The plurality of first branches and the plurality of second branches of the plurality of first touch electrodes are located in the plurality of first interlaced regions.

In an embodiment of the invention, each of the second touch electrodes includes a plurality of third main portions substantially extended in the first direction and a plurality of fourth main portions substantially extended in the second direction; the plurality of third main portions and the plurality of fourth main portions are crossed to form a plurality of second grids; each of the second grids is defined by two segments of two adjacent third main portions and two segments of two adjacent fourth main portions; and a number density of the plurality of second grids on a third interlaced region is greater than a number density thereof on a first interlaced region.

In an embodiment of the invention, a width of one of the plurality of second grids on the first interlaced region is greater than a width of another of the plurality of second grids on the third interlaced region.

In an embodiment of the invention, each of the second touch electrodes further includes a plurality of third branches and a plurality of fourth branches. The plurality of third branches are structurally separated from each other, wherein the plurality of third branches and the two segments of the two adjacent third main portions of at least one second grid of the plurality of second grids are crossed. The plurality of fourth branches are structurally separated from each other, wherein the plurality of fourth branches and the two segments of the two adjacent fourth main portions of at least one second grid of the plurality of second grids are crossed. The plurality of third branches and the plurality of fourth branches of the plurality of second touch electrodes are located in the plurality of first interlaced regions.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
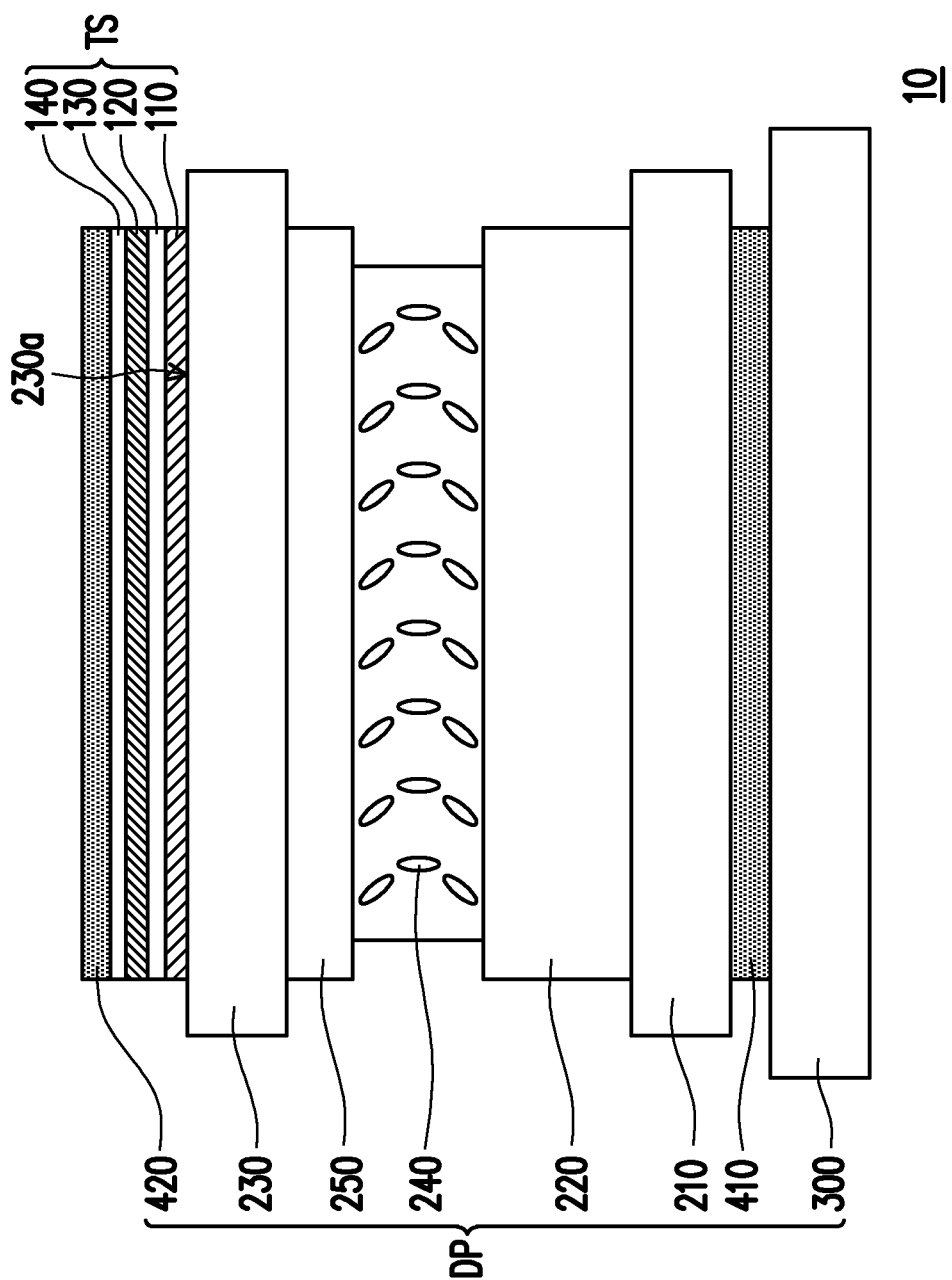
FIG. 1 is a schematic cross-sectional view of a touch apparatus 10 of an embodiment of the invention.

Hereinafter, exemplary embodiments of the invention are described in detail, and examples of the exemplary embodiments are conveyed via the figures. Wherever possible, the same reference numerals are used in the figures and the descriptions to refer to the same or similar portions.

It should be understood that, when a layer, film, region, or a device of a substrate is "on" another device or "connected to" another device, the device may be directly on the other device or connected to the other device, or an intermediate device may also be present. On the other hand, when a device is "directly on another device" or "directly connected to" another device, an intermediate device is not present. As used in the present specification, "connected to" may refer to a physical and/or electrical connection. Furthermore, "electrically connected" or "coupled" may mean that other devices are present between two devices.

"About", "similar", or "substantially" used in the present specification include the value and the average value within an acceptable deviation range of a specific value confirmed by those having ordinary skill in the art, and the concerned measurement and a specific quantity (i.e., limitations of the measuring system) of measurement-related errors are taken into consideration. For instance, "about" may represent within one or a plurality of standard deviations of the value, or within ±30%, ±20%, ±10%, or ±5%. Moreover, "about", "similar", or "substantially" used in the present specification may include a more acceptable deviation range or standard deviation according to optical properties, etching properties, or other properties, and one standard deviation does not need to apply to all of the properties.

Unless otherwise stated, all of the terminology used in the present specification (including technical and scientific terminology) have the same definition as those commonly understood by those skilled in the art of the invention. It should be further understood that, terminology defined in commonly-used dictionaries should be interpreted to have the same definitions in related art and in the entire specification of the invention, and are not interpreted as ideal or overly-formal definitions unless clearly stated as such in the present specification.

FIG. 1 is a schematic cross-sectional view of a touch apparatus 10 of an embodiment of the invention.

Please refer to FIG. 1, the touch apparatus 10 includes a touch device TS. The touch device TS includes a first conductive layer 110, a first insulating layer 120 covering the first conductive layer 110, a second conductive layer 130 disposed on the first insulating layer 120, and a second insulating layer 140 covering the second conductive layer 130.

In the present embodiment, the touch apparatus 10 may optionally include a display device DP. The display device DP includes a first substrate 210, a pixel array layer 220 disposed on the first substrate 210, a second substrate 230 disposed at the opposite side of the first substrate 210, a common electrode 250, and a display medium 240 disposed between the second substrate 230 and the pixel array layer 220, wherein the potential difference between the common electrode 250 and a plurality of pixel electrodes (not shown) of the pixel array layer 220 is configured to drive the display medium 240.

In the present embodiment, the pixel array layer 220 and the common electrode 250 of the display device DP may be optionally disposed on the first substrate 210 and the second substrate 230, respectively. However, the invention is not limited thereto. In other embodiments, the pixel array layer 220 and the common electrode 250 of the display device DP may also be disposed on the same substrate (for example, the first substrate 210).

In the present embodiment, the display medium 240 may optionally be a non-self-luminous material (such as but not limited to: liquid crystal), and the display device DP may include a backlight source 300, a first polarizer 410, and a second polarizer 420, wherein the first polarizer 410 and the second polarizer 420 are respectively located at two opposite sides of the display medium 240, and the first polarizer 410 is disposed between the backlight source 300 and the display medium 240. However, the invention is not limited thereto, and in other embodiments, the display medium 240 may also be a self-luminous material (for example, but not limited to: organic electroluminescence material, micro light-emitting diode, etc.), and the display device DP may not include the backlight source 300.

In the present embodiment, the touch device TS may be optionally formed on an outer surface 230a of the second substrate 230 of the display device DP. Specifically, in the present embodiment, the first conductive layer 110, the first insulating layer 120, the second conductive layer 130, and the second insulating layer 140 of the touch device TS may be sequentially stacked on the outer surface 230a of the second substrate 230 of the display device DP. In other words, the touch apparatus 10 of the present embodiment may be an on-cell touch apparatus. However, the invention is not limited thereto, and in another embodiment, the touch device TS may also be optionally formed on another substrate (not shown) to form a touch substrate, wherein the touch substrate is bonded to the display device DP, and the touch apparatus 10 may also be an out-cell touch apparatus; in another embodiment, the touch device TS may also be optionally formed between the second substrate 230 and the display medium 240 and/or between the first substrate 210 and the display medium 240, and the touch apparatus 10 may also be an in-cell touch apparatus.

Figure 2:
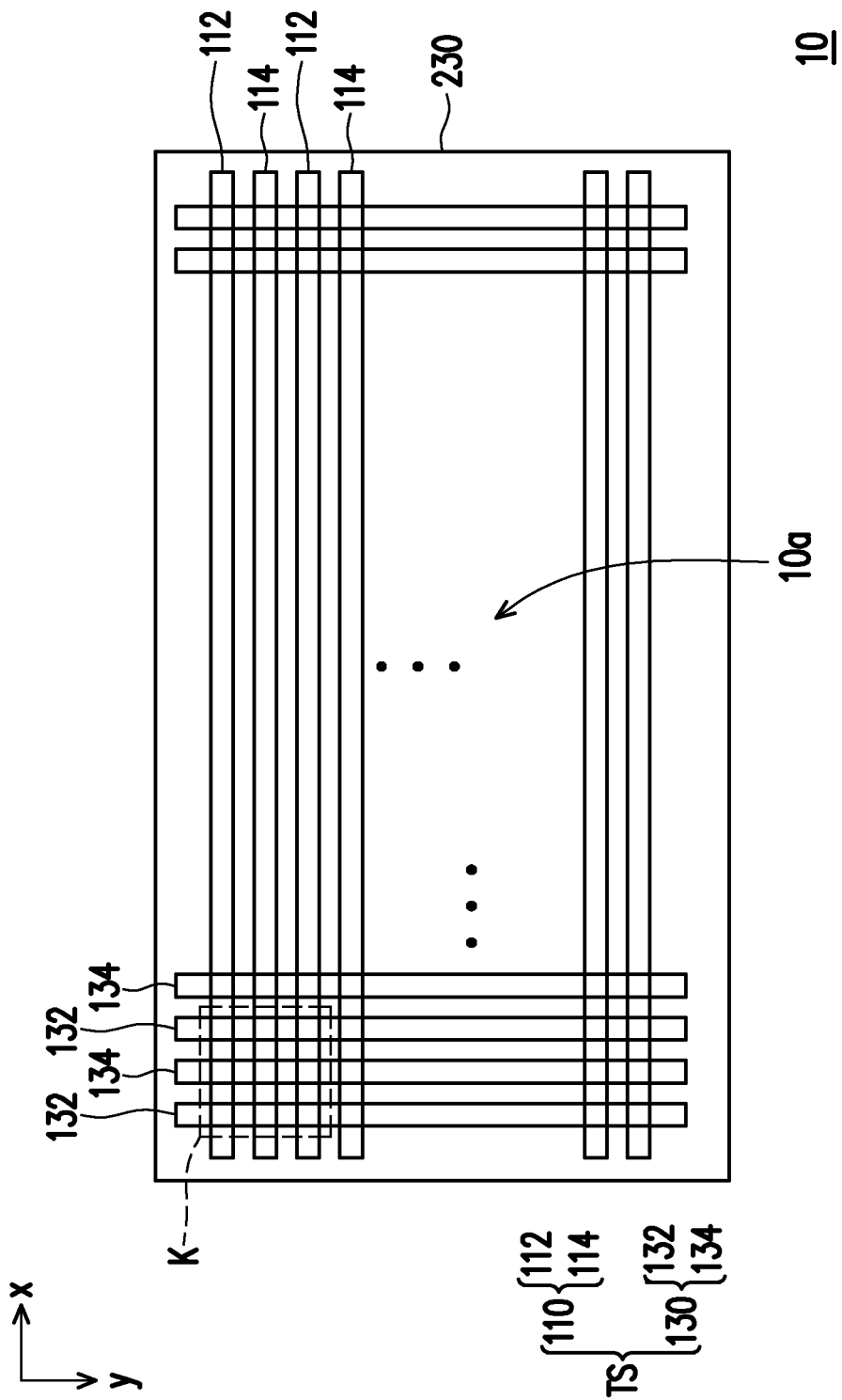
FIG. 2 is a schematic top view of a touch device TS of the touch apparatus 10 of an embodiment of the invention.

FIG. 2 is a schematic top view of the touch device TS of the touch apparatus 10 of an embodiment of the invention.

Figure 3:
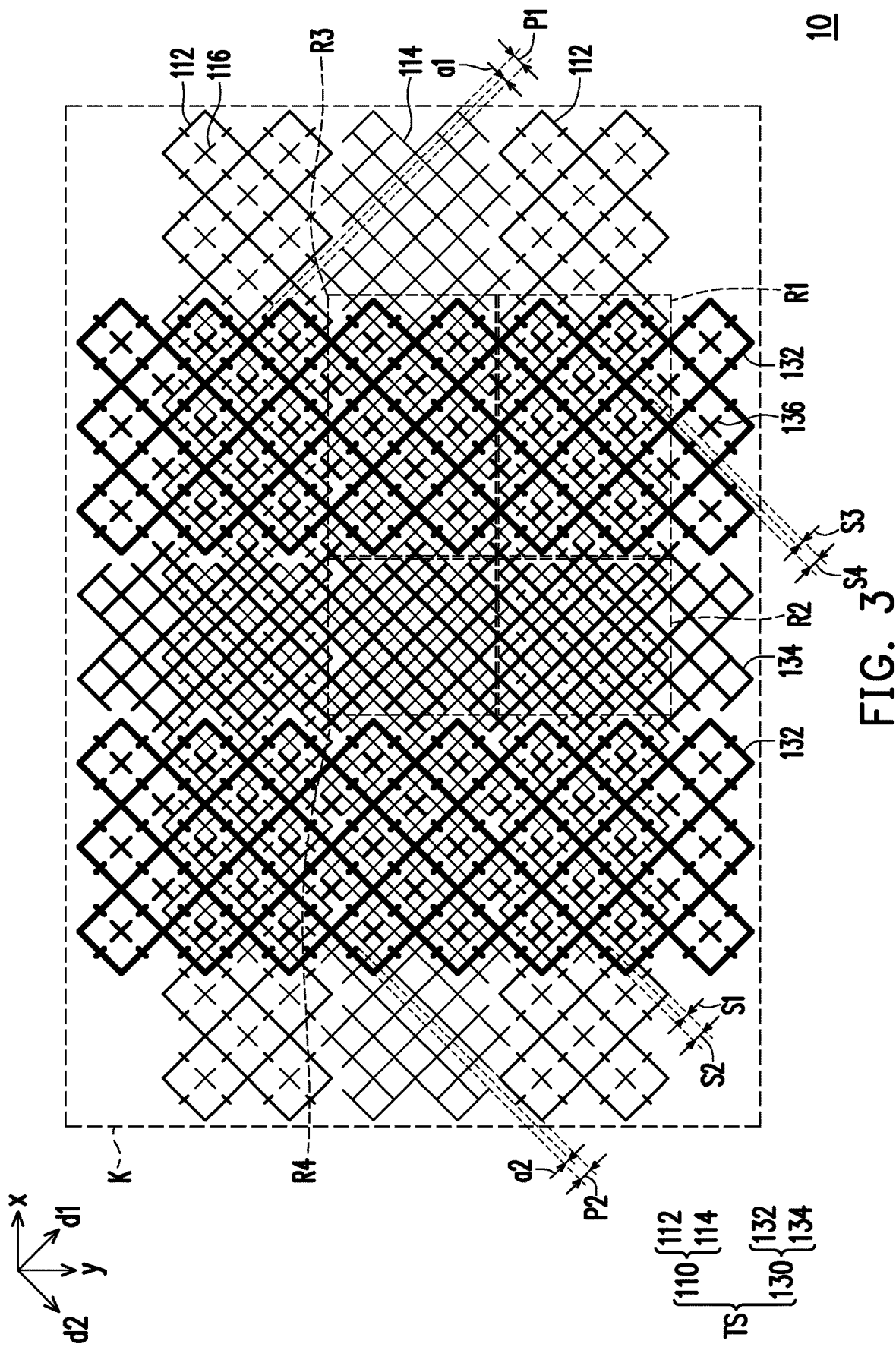
FIG. 3 is an enlarged view of a portion of the touch device TS of the touch apparatus 10 of an embodiment of the invention.

FIG. 3 is an enlarged view of a portion K of the touch device TS of the touch apparatus 10 of an embodiment of the invention. FIG. 3 corresponds to the portion K of FIG. 2. FIG. 2 omits the plurality of first dummy patterns 116 and the plurality of second dummy patterns 136 of FIG. 3.

Figure 4:
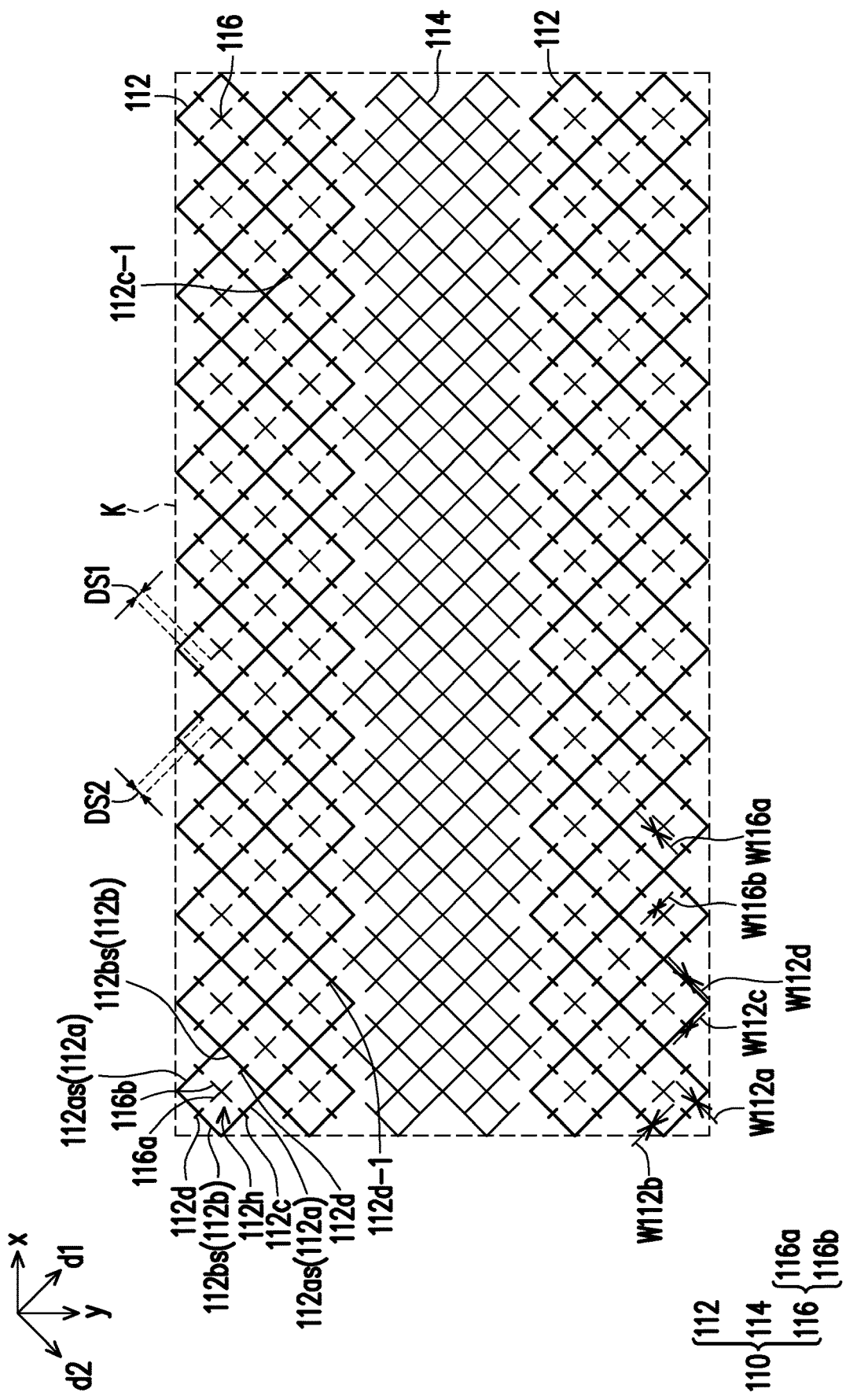
FIG. 4 shows a first conductive layer 110 of the touch device TS of the touch apparatus 10 of FIG. 3.

FIG. 4 shows the first conductive layer 110 of the touch device TS of the touch apparatus 10 of FIG. 3.

Figure 5:
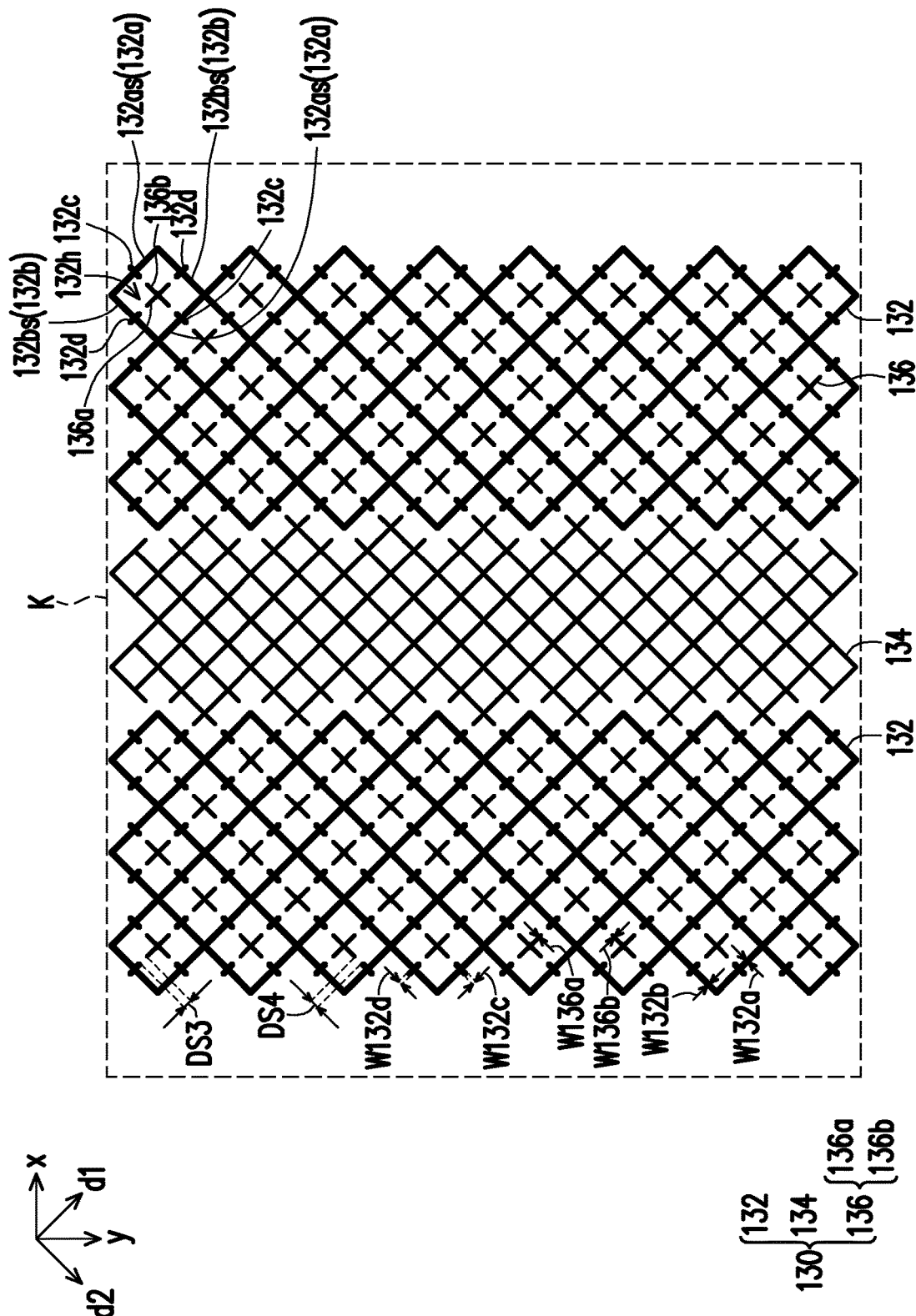
FIG. 5 shows a second conductive layer 130 of the touch device TS of the touch apparatus 10 of FIG. 3.

FIG. 5 shows the second conductive layer 130 of the touch device TS of the touch apparatus 10 of FIG. 3.

Figure 6:
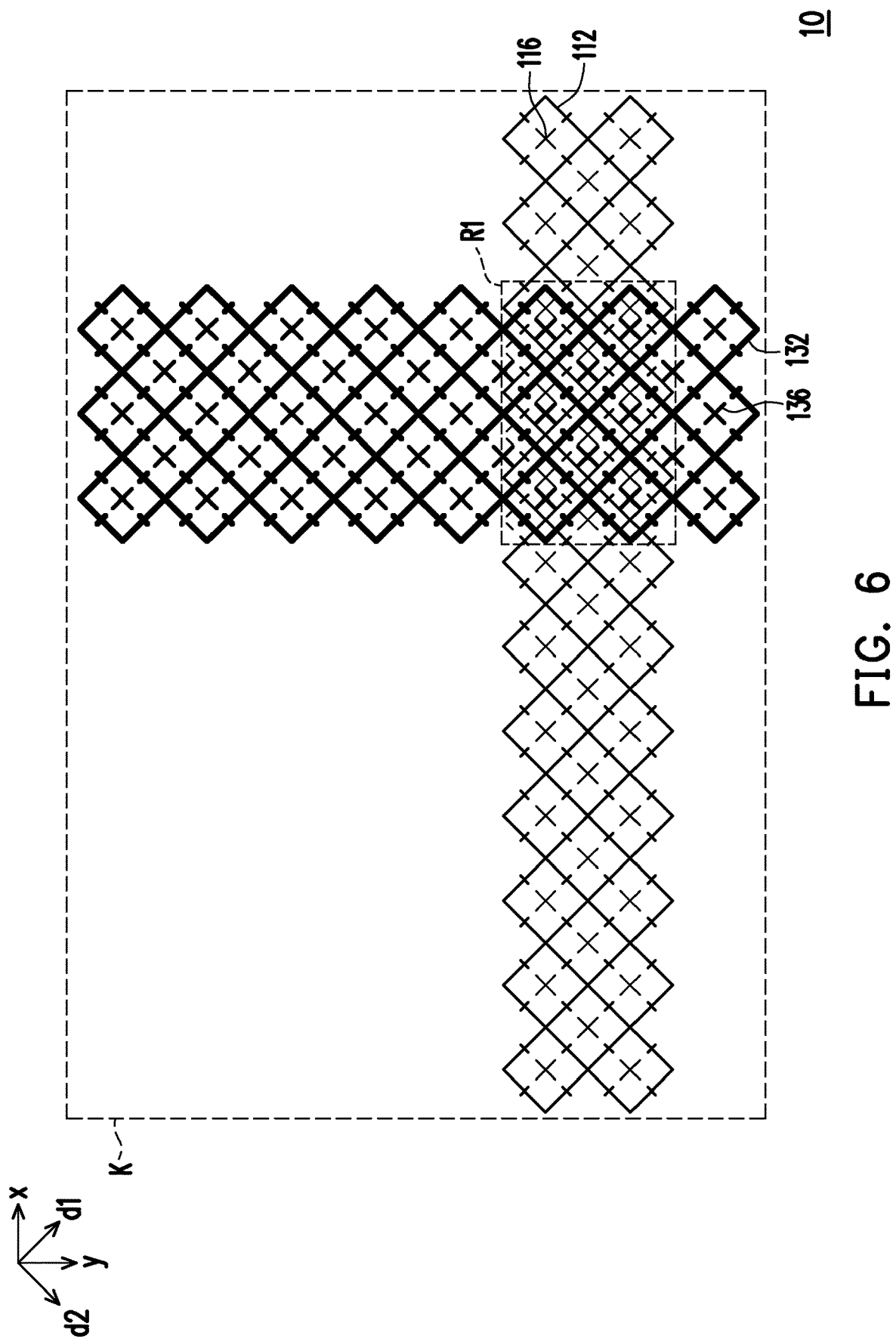
FIG. 6 shows a plurality of first dummy patterns 116, a plurality of second dummy patterns 136, and one first touch electrode 112 and one second touch electrode 132 interlaced with each other of the touch apparatus 10 of FIG. 3.

FIG. 6 shows the plurality of first dummy patterns 116, the plurality of second dummy patterns 136, and one first touch electrode 112 and one second touch electrode 132 interlaced with each other of the touch apparatus 10 of FIG. 3.

Referring to FIG. 1 and FIG. 2, the first conductive layer 110 of the touch device TS includes a plurality of first touch electrodes 112. The plurality of first touch electrodes 112 are structurally separated from each other and arranged along direction y. In the present embodiment, the first conductive layer 110 of the touch device TS further includes a plurality of first dummy electrodes 114, wherein each of the first dummy electrodes 114 is disposed between two adjacent first touch electrodes 112. The plurality of first touch electrodes 112 and the plurality of first dummy electrodes 114 are alternately arranged along direction y, and are structurally separated from each other. For example, in the present embodiment, the material of the first conductive layer 110 may include metal, but the invention is not limited thereto.

Please refer to FIG. 2, FIG. 3, and FIG. 4. In addition, it should be noted that in any of the figures in the present specification, the distance between each of the first touch electrodes 112 and the adjacent first dummy electrode 114 (that is, the width of the disconnection between the first touch electrode 112 and the first dummy electrode 114) is only shown to schematically indicate that the first touch electrode 112 is disconnected from the first dummy electrode 114; and the relationship of the distance between each of the first touch electrodes 112 and the adjacent first dummy electrode 114 (that is, the width of the disconnection between the first touch electrode 112 and the first dummy electrode 114) and the size of a first grid 112h in the figures is not intended to limit the invention.

Referring to FIG. 1, FIG. 2, and FIG. 3, the second conductive layer 130 of the touch device TS includes a plurality of second touch electrodes 132. Referring to FIG. 3 and FIG. 6, the plurality of second touch electrodes 132 and the plurality of first touch electrodes 112 are interlaced, so as to define a plurality of first interlaced regions R1. Referring to FIG. 2 and FIG. 3, the plurality of second touch electrodes 132 are structurally separated from each other and arranged along direction x. In the present embodiment, direction x and direction y may be perpendicular, but the invention is not limited thereto.

Referring to FIG. 1 and FIG. 2, for example, in the present embodiment, the plurality of first touch electrodes 112 may be used as driving electrodes (TX), and the plurality of second touch electrodes 132 may be used as receiving electrodes (RX); and the plurality of second touch electrodes 132 used as the receiving electrodes (RX) may be farther away from the display device DP than the plurality of first touch electrodes 112 used as the driving electrodes (TX); but the invention is not limited thereto.

Referring to FIG. 2 and FIG. 3, in the present embodiment, the second conductive layer 130 of the touch device TS further includes a plurality of second dummy electrodes 134, wherein each of the second dummy electrodes 134 is disposed between two adjacent second touch electrodes 132. The plurality of second touch electrodes 132 and the plurality of second dummy electrodes 134 are alternately arranged along direction x, and are structurally separated from each other. For example, in the present embodiment, the material of the second conductive layer 130 may include metal, but the invention is not limited thereto.

Please refer to FIG. 2, FIG. 3, and FIG. 5. In addition, it should be noted that in any of the figures in the present specification, the distance between each of the second touch electrodes 132 and the adjacent second dummy electrode 134 (that is, the width of the disconnection between the second touch electrode 132 and the second dummy electrode 134) is only shown to schematically indicate that the second touch electrode 132 is disconnected from the second dummy electrode 134; and the relationship of the distance between each of the second touch electrodes 132 and the adjacent second dummy electrode 134 (that is, the width of the disconnection between the second touch electrode 132 and the second dummy electrode 134) and the size of a second grid 132h in the figures is not intended to limit the invention.

Referring to FIG. 3 and FIG. 4, each of the first touch electrodes 112 includes a plurality of first main portions 112a substantially extended in a first direction d1 and a plurality of second main portions 112b substantially extended in a second direction d2, wherein the first direction d1 and the second direction d2 are staggered, the plurality of first main portions 112a and the plurality of second main portions 112b are crossed to form a plurality of first grids 112h, and each of the first grids 112h is defined by two segments 112as of two adjacent first main portions 112a and two segments 112bs of two adjacent second main portions 112b. In short, in the present embodiment, each of the first touch electrodes 112 may be a metal mesh.

Referring to FIG. 4, it is worth noting that each of the first touch electrodes 112 further includes a plurality of first branches 112c and a plurality of second branches 112d. The plurality of first main portions 112c are structurally separated from each other. The plurality of first branches 112c are crossed with the two segments 112as of two adjacent first main portions 112a of at least one first grid 112h. The plurality of second branches 112d are structurally separated from each other. The plurality of second branches 112d are crossed with the two segments 112bs of two adjacent second main portions 112b of the at least one first grid 112h.

Please refer to FIG. 3 and FIG. 4, in the present embodiment, the plurality of first touch electrodes 112 and the plurality of second touch electrodes 132 are interlaced in the plurality of first intersected regions R1, and the plurality of first branches 112c and the plurality of second branches 112d of the plurality of first touch electrodes 112 are located at least in the plurality of first interlaced regions R1. Specifically, the plurality of first touch electrodes 112 are further interlaced with the plurality of second dummy electrodes 134 to define a plurality of second interlaced regions R2; the plurality of second touch electrodes 132 are further interlaced with the plurality of first dummy electrodes 114 to define a plurality of third interlaced regions R3; and the plurality of first dummy electrodes 114 are interlaced with the plurality of second dummy electrodes 134 to define a plurality of fourth interlaced regions R4; in the present embodiment, the plurality of first branches 112c and the plurality of second branches 112d of the plurality of first touch electrodes 112 may be located in the plurality of second interlaced regions R2 in addition to the plurality of first interlaced regions R1, but the invention is not limited thereto.

Referring to FIG. 3 and FIG. 4, in the present embodiment, in the top view of the touch apparatus 10, the plurality of first branches 112c and the plurality of second branches 112d of each of the first touch electrodes 112 are separated from the second touch electrodes 132.

Referring to FIG. 1, FIG. 2, and FIG. 3, a fringe-induced electric field may be formed between the plurality of first touch electrodes 112 and the plurality of second touch electrodes 132 to detect whether there is a conductive object (such as but not limited to: a finger, a stylus, etc.) in contact with or approaching a touch surface 10a of the touch apparatus 10. Referring to FIG. 1, FIG. 3, and FIG. 4, it should be mentioned that, since the first touch electrodes 112 have the first branches 112c and the second branches 112d, a horizontal distance S1 (marked in FIG. 3) between the first branches 112c or the second branches 112d of the first touch electrodes 112 and third main portions 132a or fourth main portions 132b of the second touch electrodes 132 is less than a horizontal distance S2 between the first main portions 112a or the second main portions 112b of the first touch electrodes 112 and the third main portions 132a or the fourth main portions 132b of the second touch electrodes 132; in other words, the distance between the first branches 112c/or the second branches 112d of the first touch electrodes 112 and the third main portions 132a or the fourth main portions 132b of the second touch electrodes 132 is short; therefore, the first branches 112c and/or the second branches 112d of the first touch electrodes 112 help to push the lines of force of the fringe-induced electric field between the first touch electrodes 112 and the second touch electrodes 132 toward the touch surface 10a, thus increasing Cm % and improving Cm %-related performance of the touch apparatus 10 (for example, but not limited to: touch sensitivity), wherein Cm %=[(Cm−Cm')/Cm]*100%, wherein Cm is the sensing capacitance of the first touch electrodes 112 and the second touch electrodes 132 when no conductive object (not shown) is disposed on the touch surface 10a, and Cm' is the sensing capacitance of the first touch electrodes 112 and the second touch electrodes 132 when a conductive object (not shown) is provided on the touch surface 10a.

Referring to FIG. 3 and FIG. 4, in the present embodiment, the first conductive layer 110 of the touch device TS further includes a plurality of first dummy patterns 116 respectively disposed in the plurality of first grids 112h and separated from the plurality of first touch electrodes 112. Each of the first dummy patterns 116 includes a first portion 116a and a second portion 116b, wherein the first portion 116a and the two second branches 112d on a corresponding first grid 112h are arranged in the first direction d1 and are structurally separated from each other, and the second portion 116b is crossed with the first portion 116a, and arranged in the second direction d2 with two first branches 112c on the corresponding first grid 112h and structurally separated from the two first branches 112c. In short, the first dummy patterns 116 may be cross-shaped electrodes located in the first grids 112h of the first touch electrodes 112.

Referring to FIG. 4, in the present embodiment, there is a first distance DS1 between the first portion 116a of each of the first dummy patterns 116 and one of the two second branches 112d on a corresponding first grid 112h, and the first distance DS1 is less than or equal to 8 μm; and there is a second distance DS2 between the second portion 116b of each of the first dummy patterns 116 and one of the two first branches 112c on the corresponding first grid 112h, and the second distance DS2 is less than or equal to 8 μm. In other words, in the present embodiment, there are a plurality of breakpoints (that is, the labels DS1 and DS2) between each of the first dummy patterns 116 and a corresponding first touch electrode 112, and the width of each breakpoint is less than or equal to 8 μm.

Referring to FIG. 4, in the present embodiment, the linewidth of at least one of the first main portions 112a of the first touch electrodes 112, the second main portions 112b of the first touch electrodes 112, the first branches 112c of the first touch electrodes 112, the second branches 112d of the first touch electrodes 112, the first portions 116a of the first dummy patterns 116, and the second portions 116b of the first dummy patterns 116 is less than or equal to 8 μm. For example, in the present embodiment, a line width W112a of the first main portions 112a of the first touch electrodes 112, a line width W112b of the second main portions 112b of the first touch electrodes 112, a line width W112c of the first branches 112c of the first touch electrodes 112, a line width W112d of the second branches 112d of the first touch electrodes 112, a line width W116a of the first portions 116a of the first dummy patterns 116, and a line width W116b of the second portions 116b of the first dummy patterns 116 are all less than or equal to 8 μm, but the invention is not limited thereto.

Referring to FIG. 3 and FIG. 5, each of the second touch electrodes 132 includes a plurality of third main portions 132a substantially extended in the first direction d1 and a plurality of fourth main portions 132b substantially extended in the second direction d2, wherein the plurality of third main portions 132a and the plurality of fourth main portions 132b are crossed to form a plurality of second grids 132h, and each of the second grids 132h is defined by two segments 132as of two adjacent third main portions 132a and two segments 132bs of two adjacent fourth main portions 132b. In short, in the present embodiment, each of the second touch electrodes 132 may be a metal mesh.

Referring to FIG. 5, it is worth noting that, in the present embodiment, each of the second touch electrodes 132 further includes a plurality of third branches 132c and a plurality of fourth branches 132d. The plurality of third branches 132c are structurally separated from each other, wherein the plurality of third branches 132c and the two segments 132as of two adjacent third main portions 132a of at least one second grid 132h are crossed. The plurality of fourth branches 132d are structurally separated from each other, wherein the plurality of fourth branches 132d and the two segments 132bs of two adjacent fourth main portions 132b of at least one second grid 132h are crossed.

Referring to FIG. 3 and FIG. 5, in the present embodiment, the plurality of third branches 132c and the plurality of fourth branches 132d of the plurality of second touch electrodes 132 are located at least in the plurality of first interlaced regions R1. Specifically, in the present embodiment, the plurality of third branches 132c and the plurality of fourth branches 132d of the plurality of second touch electrodes 132 may also be located in the plurality of third interlaced regions R3 in addition to the plurality of first interlaced regions R1.

Referring to FIG. 3 and FIG. 5, in the present embodiment, in the top view of the touch apparatus 10, the plurality of third branches 132c and the plurality of fourth branches 132d of each of the second touch electrodes 132 are separated from the plurality of first touch electrodes 112.

Referring to FIG. 1, FIG. 3, and FIG. 5, similarly, since the second touch electrodes 132 have the third branches 132c and the fourth branches 132d, a horizontal distance S3 (marked in FIG. 3) between the third branches 132c or the fourth branches 132d of the second touch electrodes 132 and the first main portions 112a or the second main portions 112b of the first touch electrodes 112 is less than a horizontal distance S4 (marked in FIG. 3) between the third main portions 132a or the fourth main portions 132b of the second touch electrodes 132 and the first main portions 112a or the second main portions 112b of the first touch electrodes 112; in other words, the distance between the third branches 132c/or the fourth branches 132d of the second touch electrodes 132 and the first main portions 112a or the second main portions 112b of the first touch electrodes 112 is short; therefore, the third branches 132c and/or the fourth branches 132d of the second touch electrodes 132 help to push the lines of force of the fringe-induced electric field between the first touch electrodes 112 and the second touch electrodes 132 toward the touch surface 10a, thus increasing Cm % and improving Cm %-related performance of the touch apparatus 10 (for example, but not limited to: touch sensitivity).

Referring to FIG. 3 and FIG. 5, in the present embodiment, the second conductive layer 130 of the touch device TS further includes a plurality of second dummy patterns 136 respectively disposed in the plurality of second grids 132h and separated from the plurality of second touch electrodes 132. Each of the second dummy patterns 136 includes a third portion 136a and a fourth portion 136b, wherein the third portion 136a and the two fourth branches 132d on a corresponding first grid 132h are arranged in the first direction d1 and structurally separated from each other, and the fourth portion 136b is crossed with the third portion 136a, and arranged in the second direction d2 with the two third branches 132c on the corresponding second grid 132h and structurally separated from the two third branches 132c. In short, the second dummy patterns 136 may be cross-shaped electrodes located in the second grids 132h of the second touch electrodes 132.

Referring to FIG. 5, in the present embodiment, there is a third distance DS3 between the third portion 136a of each of the second dummy patterns 136 and one of the two fourth branches 132d on a corresponding second grid 132h, and the third distance DS3 is less than or equal to 8 μm; and there is a fourth distance DS4 between the fourth portion 136b of each of the second dummy patterns 136 and one of the two third branches 132c on the corresponding second grid 132h, and the fourth distance DS4 is less than or equal to 8 μm. In short, in the present embodiment, there are a plurality of breakpoints (that is, the labels DS3 and DS4) between each of the second dummy patterns 136 and a corresponding second touch electrode 132, and the width of each breakpoint is less than or equal to 8 μm.

Referring to FIG. 5, in the present embodiment, the linewidth of at least one of the third main portions 132a of the second touch electrodes 132, the fourth main portions 132b of the second touch electrodes 132, the third branches 132c of the second touch electrodes 132, the fourth branches 132d of the second touch electrodes 132, the third portions 136a of the second dummy patterns 136, and the fourth portions 136b of the second dummy patterns 136 is less than or equal to 8 μm. For example, in the present embodiment, a line width W132a of the third main portions 132a of the second touch electrodes 132, a line width W132b of the fourth main portions 132b of the second touch electrodes 132, a line width W132c of the third branches 132c of the second touch electrodes 132, a line width W132d of the fourth branches 132d of the second touch electrodes 132, a line width W136a of the third portions 136a of the second dummy patterns 136, and a line width W136b of the fourth portions 136b of the second dummy patterns 136 are all less than or equal to 8 μm, but the invention is not limited thereto.

Figure 7:
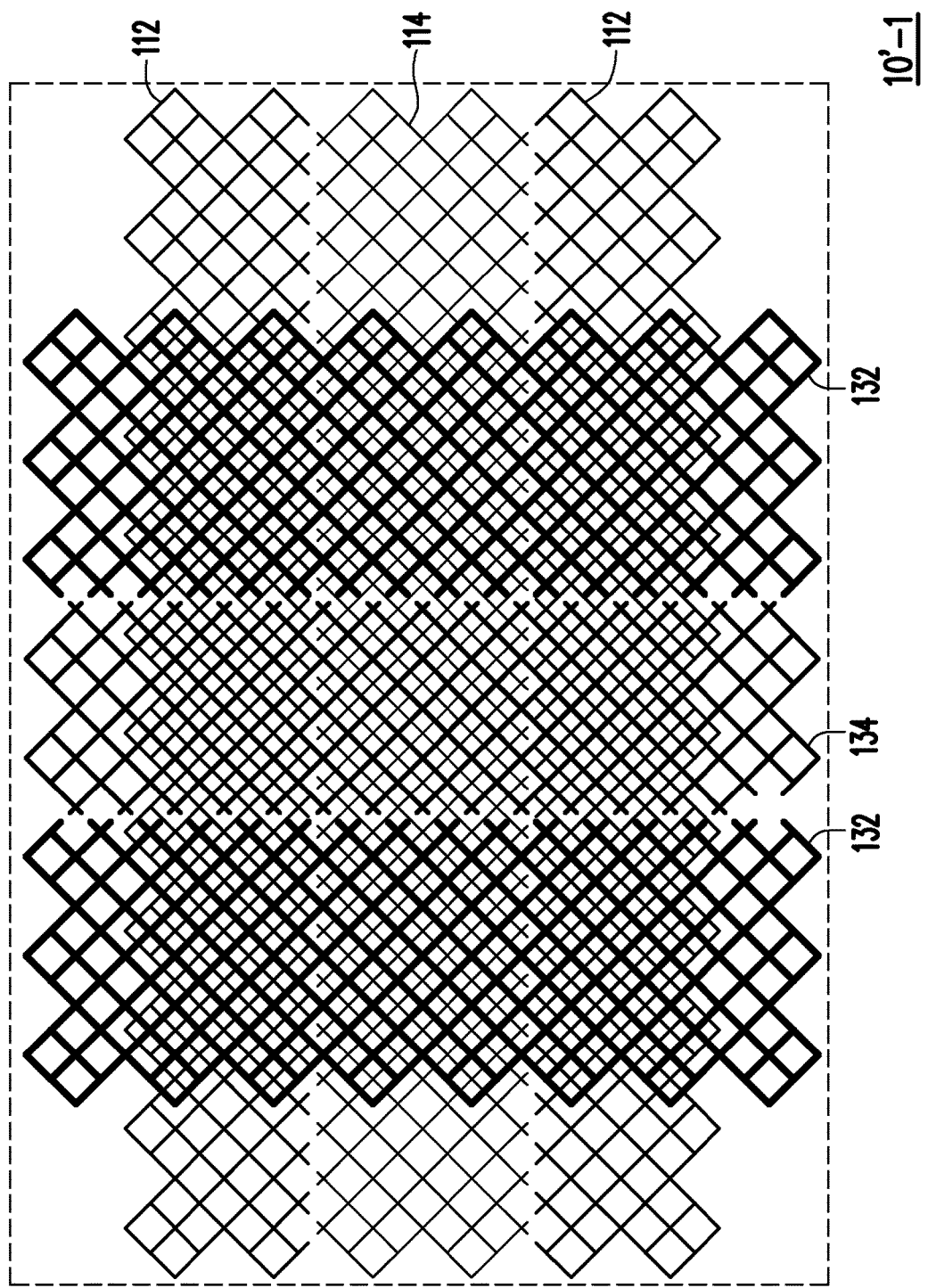
FIG. 7 is a schematic top view of a touch apparatus 10'-1 of the first comparative example.

FIG. 7 is a schematic top view of a touch apparatus 10'-1 of the first comparative example. The touch apparatus 10'-1 of the first comparative example of FIG. 7 is similar to the touch apparatus 10 of the above embodiments, and the difference between the two is: the first conductive layer 110 of the touch apparatus 10'-1 of the first comparative example includes the first touch electrodes 112 and the first dummy electrodes 114, but does not include the first dummy patterns 116 of the touch apparatus 10 located in the first grids 112h of the first touch electrodes 112; the first grids 112h of the first touch electrodes 112 of the touch apparatus 10'-1 of the first comparative example are smaller and more densely distributed than the first grids 112h of the first touch electrodes 112 of the touch apparatus 10 of the above embodiments; the first grids 112h of the touch apparatus 10'-1 of the first comparative example are not provided with the first branches 112c and the second branches 112d of the touch apparatus 10 of the above embodiments; the second conductive layer 130 of the touch apparatus 10'-1 of the first comparative example includes the second touch electrodes 132 and the second dummy electrodes 134, but does not include the second dummy patterns 136 of the touch apparatus 10 of the above embodiments located in the second grids 132h of the second touch electrode 132; the second grids 132h of the second touch electrodes 132 of the touch apparatus 10'-1 of the first comparative example are smaller and more densely distributed than the second grids 132h of the second touch electrodes 132 of the touch apparatus 10 of the above embodiments; and the second grids 132h of the touch apparatus 10'-1 of the first comparative example are not provided with the third branches 132c and the fourth branches 132d of the touch apparatus 10 of the above embodiments.

Figure 8:
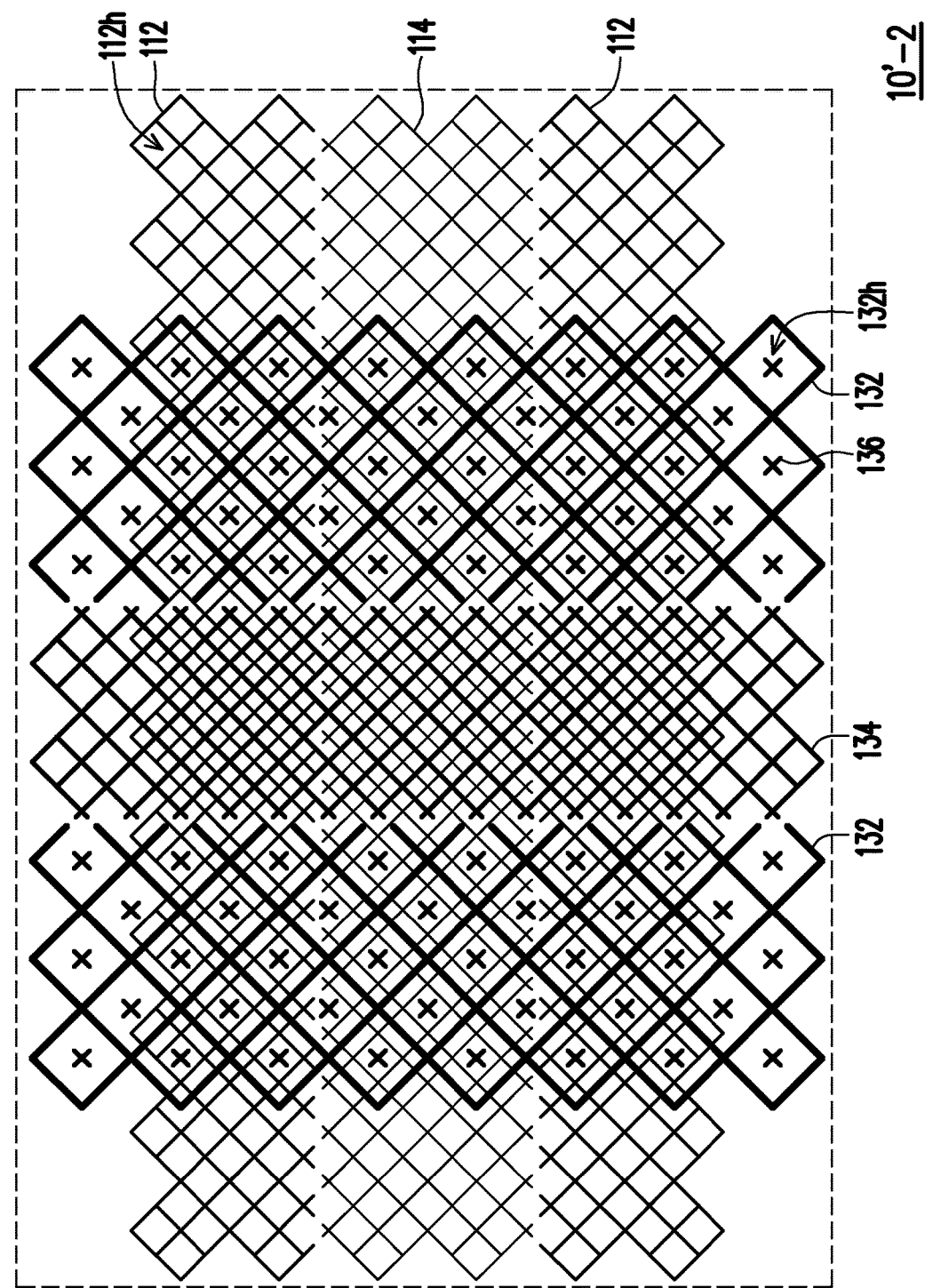
FIG. 8 is a schematic top view of a touch apparatus 10'-2 of the second comparative example.

FIG. 8 is a schematic top view of a touch apparatus 10'-2 of the second comparative example. The touch apparatus 10'-2 of the second comparative example of FIG. 8 is similar to the touch apparatus 10 of the above embodiments, and the difference between the two is: the first grids 112h of the touch apparatus 10'-2 of the second comparative example are not provided with the first branches 112c and the second branches 112d of the touch apparatus 10 of the above embodiments; the first conductive layer 110 of the touch apparatus 10'-2 of the second comparative example includes the first touch electrodes 112 and the first dummy electrodes 114, but does not include the first dummy patterns 116 of the touch apparatus 10 of the above embodiments located in the second grids 112h of the first touch electrodes 112; the second grids 112h of the first touch electrodes 112 of the touch apparatus 10'-2 of the second comparative example are smaller and more densely distributed than the first grids 112h of the first touch electrodes 112 of the touch apparatus 10 of the above embodiments; and the second grids 132h of the touch apparatus 10'-2 of the second comparative example are not provided with the third branches 132c and the fourth branches 132d of the touch apparatus 10 of the above embodiments.

Figure 9:
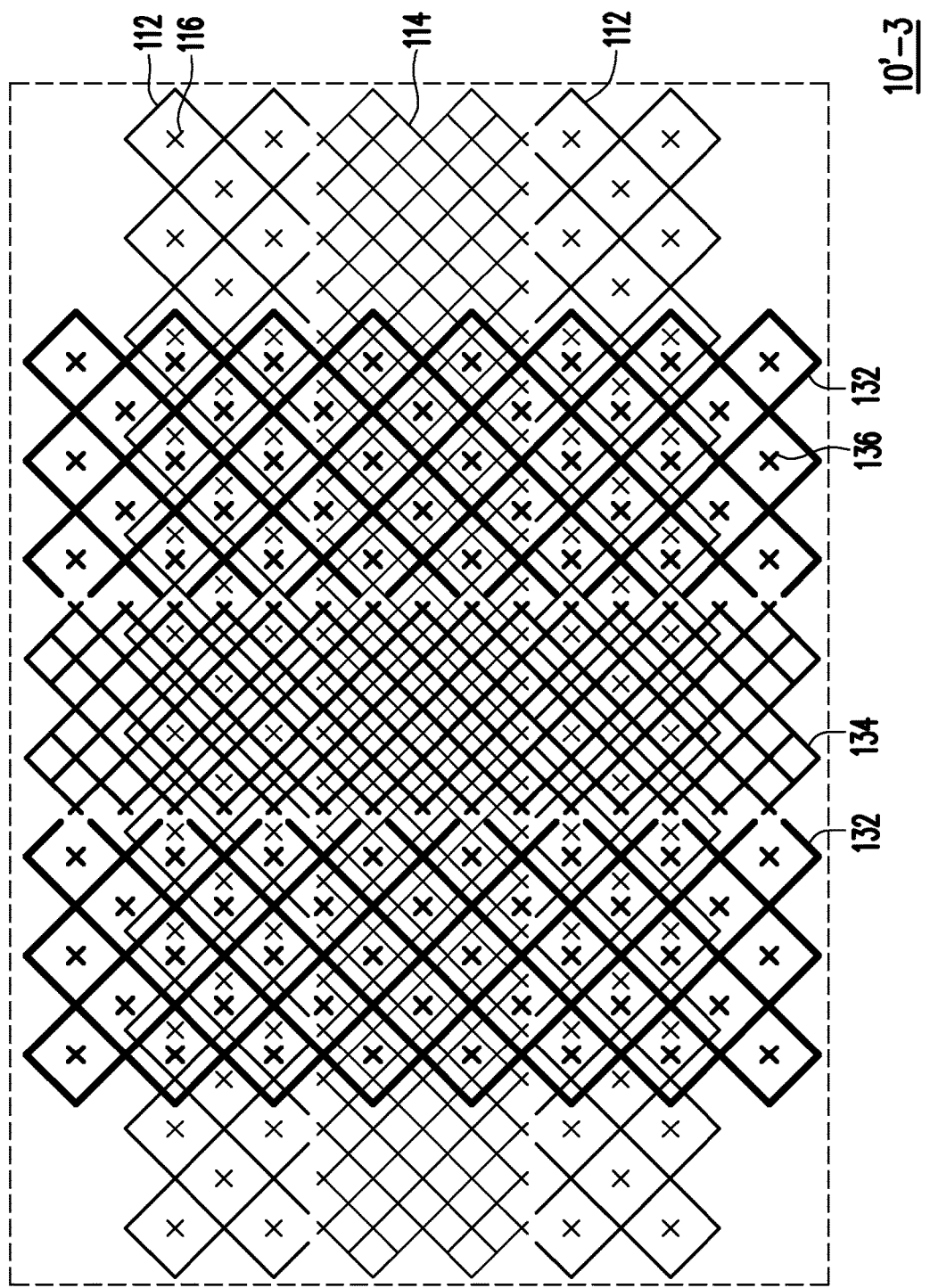
FIG. 9 is a schematic top view of a touch apparatus 10'-3 of the third comparative example.

FIG. 9 is a schematic top view of a touch apparatus 10'-3 of the third comparative example. The touch apparatus 10'-3 of the third comparative example of FIG. 9 is similar to the touch apparatus 10 of the above embodiments, and the difference between the two is: the first grids 112h of the touch apparatus 10'-3 of the third comparative example are not provided with the first branches 112c and the second branches 112d of the touch apparatus 10 of the above embodiments; and the second grids 132h of the touch apparatus 10'-3 of the third comparative example are not provided with the third branches 132c and the fourth branches 132d of the touch apparatus 10 of the above embodiments.

Please refer to Table 1 below. The data in Table 1 refers to the data of one sensing unit of each comparative example and embodiment. The sensing unit includes all members of each comparative example and embodiment in one first interlaced region R1. Cm in Table 1 refers to the sensing capacitance of the first touch electrodes 112 and the second touch electrodes 132 when no conductive object is disposed on the touch surface of each comparative example and embodiment. Cp in Table 1 refers to the parasitic capacitance between the second touch electrodes 132 and the common electrode 250. In Table 1, $\Delta Cm = Cm - Cm'$, wherein $Cm'$ refers to the sensing capacitance of the first touch electrodes 112 and the second touch electrodes 132 when a conductive object is disposed on the touch surface of each comparative example and embodiment. In Table 1, $Cm\ \% = [(Cm - Cm')/Cm]*100\%$, wherein Cm is the sensing capacitance of the first touch electrodes 112 and the second touch electrodes 132 when no conductive object (not shown) is disposed on the touch surface 10a, and Cm' is the sensing capacitance of the first touch electrodes 112 and the second touch electrodes 132 when a conductive object (not shown) is provided on the touch surface 10a.

The data in Table 1 may prove that the touch apparatus 10 of an embodiment of the invention has at least one of the following benefits:

1. A plurality of breakpoints (that is, the places marked DS1 and DS2) between each of the first dummy patterns 116 and a corresponding first touch electrode 112 and/or a plurality of breakpoints (that is, the places marked DS3 and DS4) between each of the second virtual patterns 136 and a corresponding second touch electrode 132 may reduce the number of intersections of the first touch electrodes 112 and the second touch electrodes 132, thus effectively reducing overall capacitance (i.e., Cm+Cp) and increasing Cm %; further adjusting the resistance of the first touch electrodes 112 and the second touch electrodes 132 (for example, but not limited to: increasing film thickness) may reduce the RC loading of the touch apparatus 10;

2. By disposing the first branches 112c and the second branches 112d on the first grids 112h of the first touch electrodes 112 and/or by disposing the third branches 132c and the fourth branches 132d on the second grids 132h of the second touch electrodes 132, the lines of force of the fringe-induced electric field between the first touch electrodes 112 and the second touch electrodes 132 may be pushed up to the touch surface 10a, thereby increasing Cm %, and improving Cm %-related performance of the touch apparatus 10 (for example, but not limited to: touch sensitivity);

3. There are no visual effect issues such as moiré.

TABLE 1

| | Touch apparatus of first comparative example | Touch apparatus of second comparative example | Touch apparatus of third comparative example | Touch apparatus 10 of embodiment |
|---|---|---|---|---|
| In one sensing unit, the number of interlaced portions of the first touch electrodes 112 and the second touch | 80 | 40 | 20 | 24 |

TABLE 1-continued

| | Touch apparatus of first comparative example | Touch apparatus of second comparative example | Touch apparatus of third comparative example | Touch apparatus 10 of embodiment |
|---|---|---|---|---|
| electrodes 132 Moiré | OK | OK | OK | OK |
| Cm + Cp of one sensing unit | 2.20 pF + 2.21 pF | 1.28 pF + 1.31 pF | 0.79 pF + 1.61 pF | 0.95 pF + 2.03 pF |
| ΔCm of one sensing unit | 0.138 pF | 0.089 pF | 0.063 pF | 0.084 pF |
| Cm % of one sensing unit | 6.3% | 6.9% | 8.0% | 8.8% |

Please refer to FIG. 3, FIG. 4, and FIG. 5. In the present embodiment, in the top view of the touch apparatus 10, the plurality of first main portions 112a of the plurality of first touch electrodes 112, the plurality of third main portions 132a of the plurality of second touch electrodes 132, the plurality of first portions 116a of the plurality of first dummy patterns 116, and the plurality of third portions 136a of the plurality of second dummy patterns 136 are arranged along the second direction d2 at a pitch P1, the first portion 112c-1 of one first branch 112c of a first touch electrode 112 is located at a side of a corresponding first main portion 112a, the length of the first portion 112c-1 of the first branch 112c is a1, and $0.25 \cdot P1 \leq a1 \leq 0.75 \cdot P1$.

Please refer to FIG. 3, FIG. 4, and FIG. 5. In the present embodiment, in the top view of the touch apparatus 10, the plurality of second main portions 112b of the plurality of first touch electrodes 112, the plurality of fourth main portions 132b of the plurality of second touch electrodes 132, the plurality of second portions 116b of the plurality of first dummy patterns 116, and the plurality of fourth portions 136b of the plurality of second dummy patterns 136 are arranged along the first direction d1 at a pitch P2, the first portion 112d-1 of one second branch 112d of a first touch electrode 112 is located at a side of a corresponding second main portion 112b, the length of the first portion 112d-1 of the second branch 112d is a2, and $0.25 \cdot P2 \leq a2 \leq 0.75 \cdot P2$.

Referring to Table 2 below, the data in Table 2 refers to the data of one sensing unit of the first comparative example and the embodiment. In addition to the data of one sensing unit of the first comparative example, Table 2 also lists the data of one sensing unit of the touch apparatus 10 of an embodiment under various relationships between a1 and P1 and various relationships between a2 and P2. The data of Table 2 proves that $0.25 \cdot P1 \leq a1 \leq 0.75 \cdot P1$ and/or $0.25 \cdot P2 \leq a2 \leq 0.75 \cdot P2$, Cm % may be increased without visual effect issues such as moiré, and Cm %-related performance of the touch apparatus 10 may be improved (for example, but not limited to: touch sensitivity).

TABLE 2

| | Touch apparatus of Comparative example 1 | Touch apparatus 10 of embodiment (a1 = 0.50 · P1; a2 = 0.50 · P2) | Touch apparatus 10 of embodiment (a1 = 0.25 · P1; a2 = 0.25 · P2) | Touch apparatus 10 of embodiment (a1 = 0.75 · P1; a2 = 0.75 · P2) |
|---|---|---|---|---|
| In one sensing unit, the number of interlaced portions of the first touch electrodes 112 and the second touch electrodes 132 | 80 | 24 | 24 | 24 |
| Moiré | OK | OK | OK | OK |
| Cm + Cp of one sensing unit | 2.20 pF + 2.21 pF | 0.95 pF + 2.03 pF | 0.87 pF + 1.93 pF | 1.09 pF + 2.13 pF |
| ΔCm of one sensing unit | 0.138 pF | 0.084 pF | 0.076 pF | 0.096 pF |
| Cm % of one sensing unit | 6.3% | 8.8% | 8.8% | 8.8% |

It should be mentioned here that, the following embodiments adopt the reference numerals of the embodiments above and a portion of the content thereof, wherein the same reference numerals are used to represent the same or similar devices and descriptions of the same technical content are omitted. The omitted portions are as described in the embodiments above and are not repeated in the embodiments below.

Figure 10:
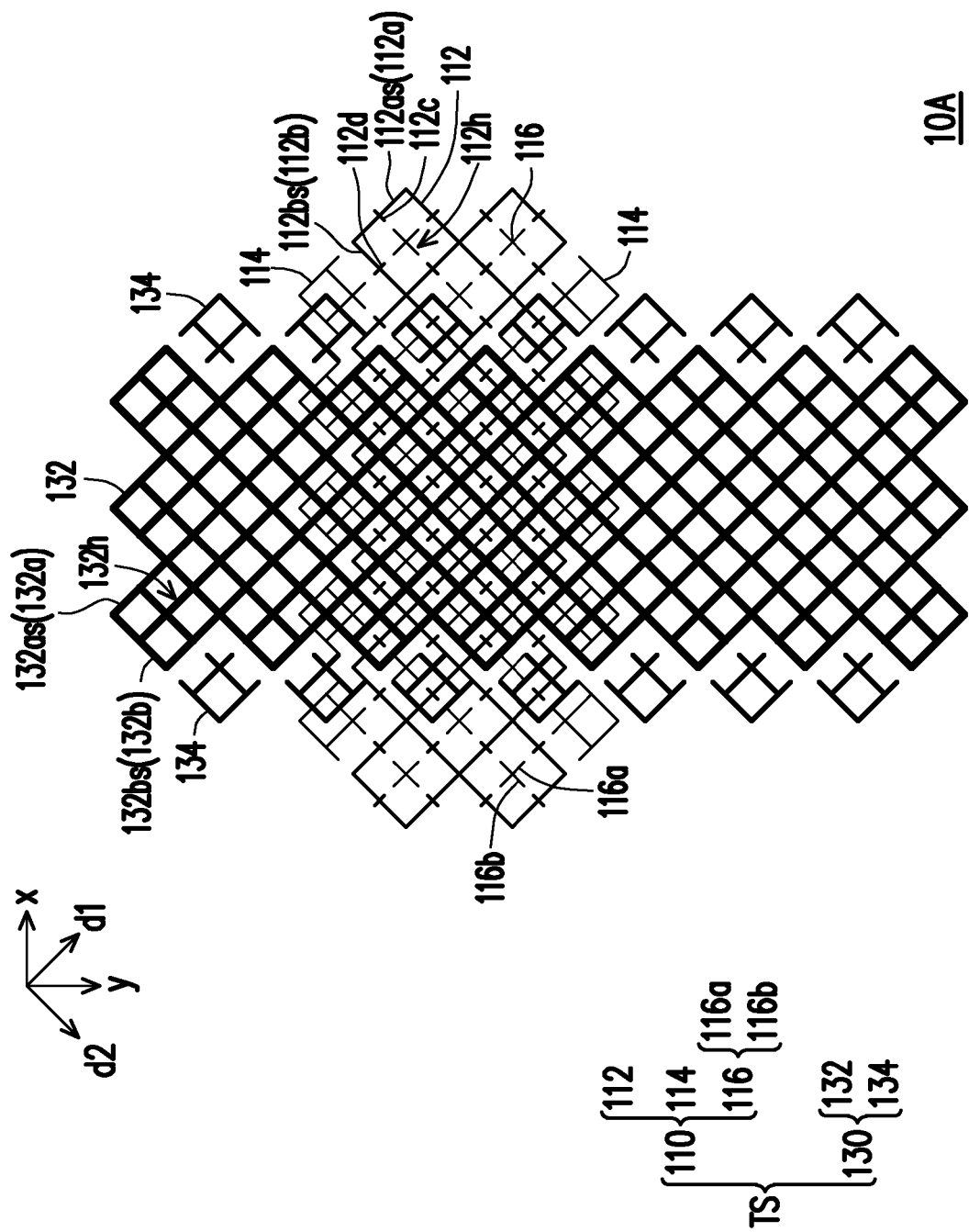
FIG. 10 is a schematic top view of a touch apparatus 10A of an embodiment of the invention.

FIG. 10 is a schematic top view of a touch apparatus 10A of an embodiment of the invention. The touch apparatus 10A of FIG. 10 is similar to the touch apparatus 10. The difference between the two is that the second conductive layer 130 of the touch apparatus 10A of FIG. 10 is different from the second conductive layer 130 of the touch apparatus 10.

Referring to FIG. 10, specifically, in the present embodiment, the second conductive layer 130 includes the second touch electrodes 132 and the second dummy electrodes 134, but does not include the second dummy patterns 136 of the touch apparatus 10; the second grids 132h of the second touch electrodes 132 of the touch apparatus 10A are smaller and denser than the second grids 132h of the second touch electrodes 132 of the touch apparatus 10; and the third branches 132c and the fourth branches 132d of the touch apparatus 10 are not provided on the second grids 132h of the touch apparatus 10A.

Figure 11:
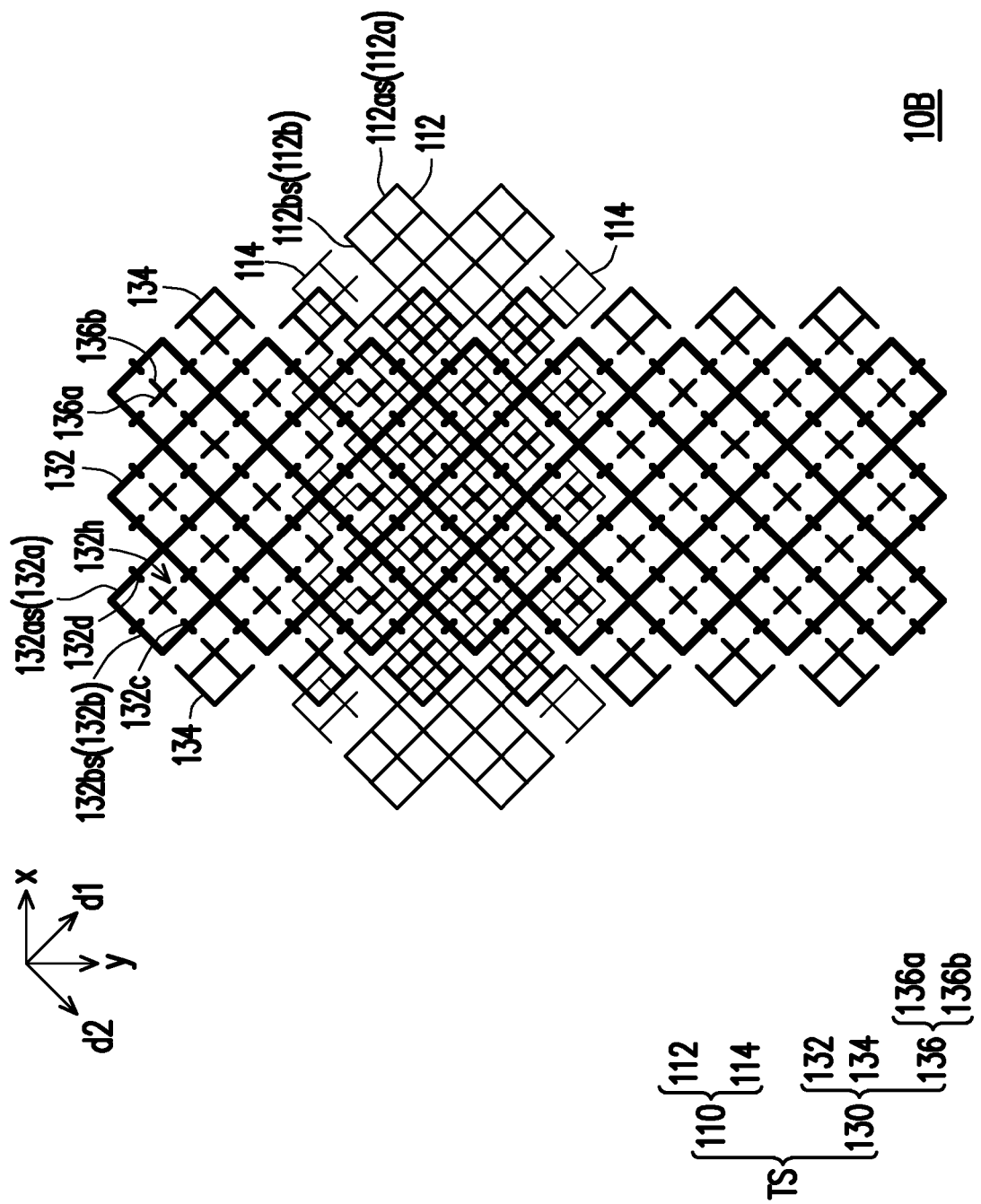
FIG. 11 is a schematic top view of a touch apparatus 10B of an embodiment of the invention.

FIG. 11 is a schematic top view of a touch apparatus 10B of an embodiment of the invention. The touch apparatus 10B of FIG. 11 is similar to the touch apparatus 10. The difference between the two is that the first conductive layer 110 of the touch apparatus 10B of FIG. 11 is different from the first conductive layer 110 of the touch apparatus 10.

Referring to FIG. 11, specifically, in the present embodiment, the first conductive layer 110 includes the first touch electrodes 112 and the first dummy electrodes 114, but does not include the first dummy patterns 116 of the touch apparatus 10; the first grids 112h of the first touch electrodes 112 of the touch apparatus 10B are smaller and denser than the first grids 112h of the first touch electrodes 112 of the touch apparatus 10; and the first branches 112c and the second branches 112d of the touch apparatus 10 are not provided on the first grids 112h of the touch apparatus 10B.

It should be mentioned that, in the embodiment of FIG. 11, since the first grids 112h of the first touch electrodes 112 of the touch apparatus 10B are more densely distributed, and the first touch electrodes 112 belonging to the first conductive layer 110 are disposed between the second touch electrodes 132 belonging to the second conductive layer 130 and the display device DP (refer to FIG. 1), the first touch electrodes 112 of the touch apparatus 10B may provide a better shielding effect and reduce the mutual interference between the signal of the touch device TS and the signal of the display device DP.

Figure 12:
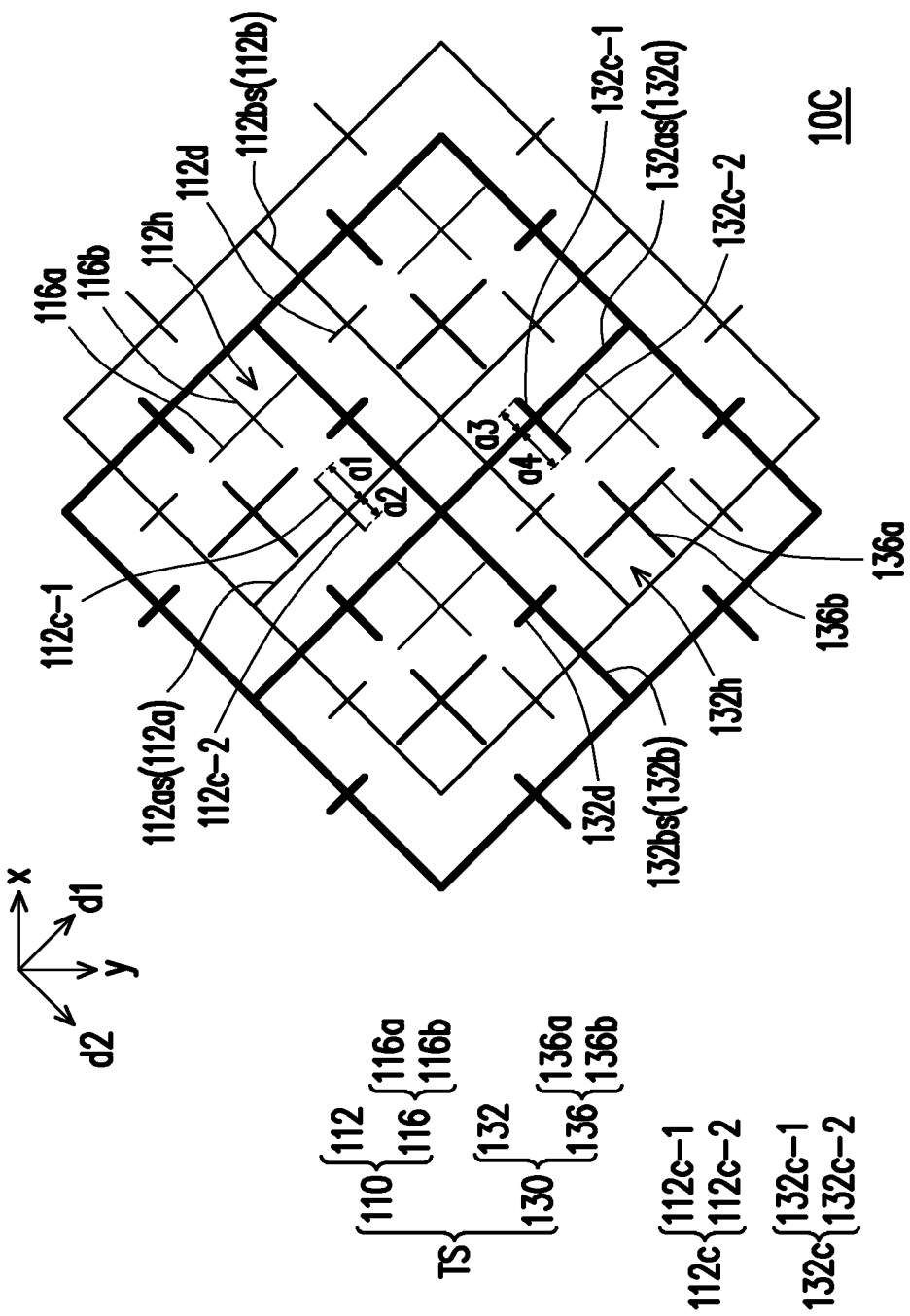
FIG. 12 is a schematic top view of a touch apparatus 10C of an embodiment of the invention.

FIG. 12 is a schematic top view of a touch apparatus 10C of an embodiment of the invention. FIG. 12 omits the first dummy electrodes and the second dummy electrodes. The touch apparatus 10C of FIG. 12 is similar to the touch apparatus 10, and the difference between the two is: the first branches 112c and the third branches 132c of the touch apparatus 10C of FIG. 12 are different from the first branches 112c and the third branches 132c of the touch apparatus 10.

Referring to FIG. 12, specifically, in the present embodiment, the first branches 112c of the touch apparatus 10C include a first portion 112c-1 and a second portion 112c-2 respectively located at two opposite sides of a corresponding first main portion 112a, and a length a1 of the first portion 112c-1 of the first branches 112c is different from a length a2 of the second portion 112c-2 of the first branches 112c; the third branches 132c of the touch apparatus 10C include a first portion 132c-1 and a second portion 132c-2 respectively located at two opposite sides of a corresponding third main portion 132a, and a length a3 of the first portion 132c-1 of the third branches 132c is different from a length a4 of the second portion 132c-2 of the third branches 132c. In other words, the first branches 112c of the touch apparatus 10C are distributed asymmetrically with respect to a first main portion 112a, and the third branches 132c of the touch apparatus 10C are distributed asymmetrically with respect to a third main portion 132a.

Figure 13:
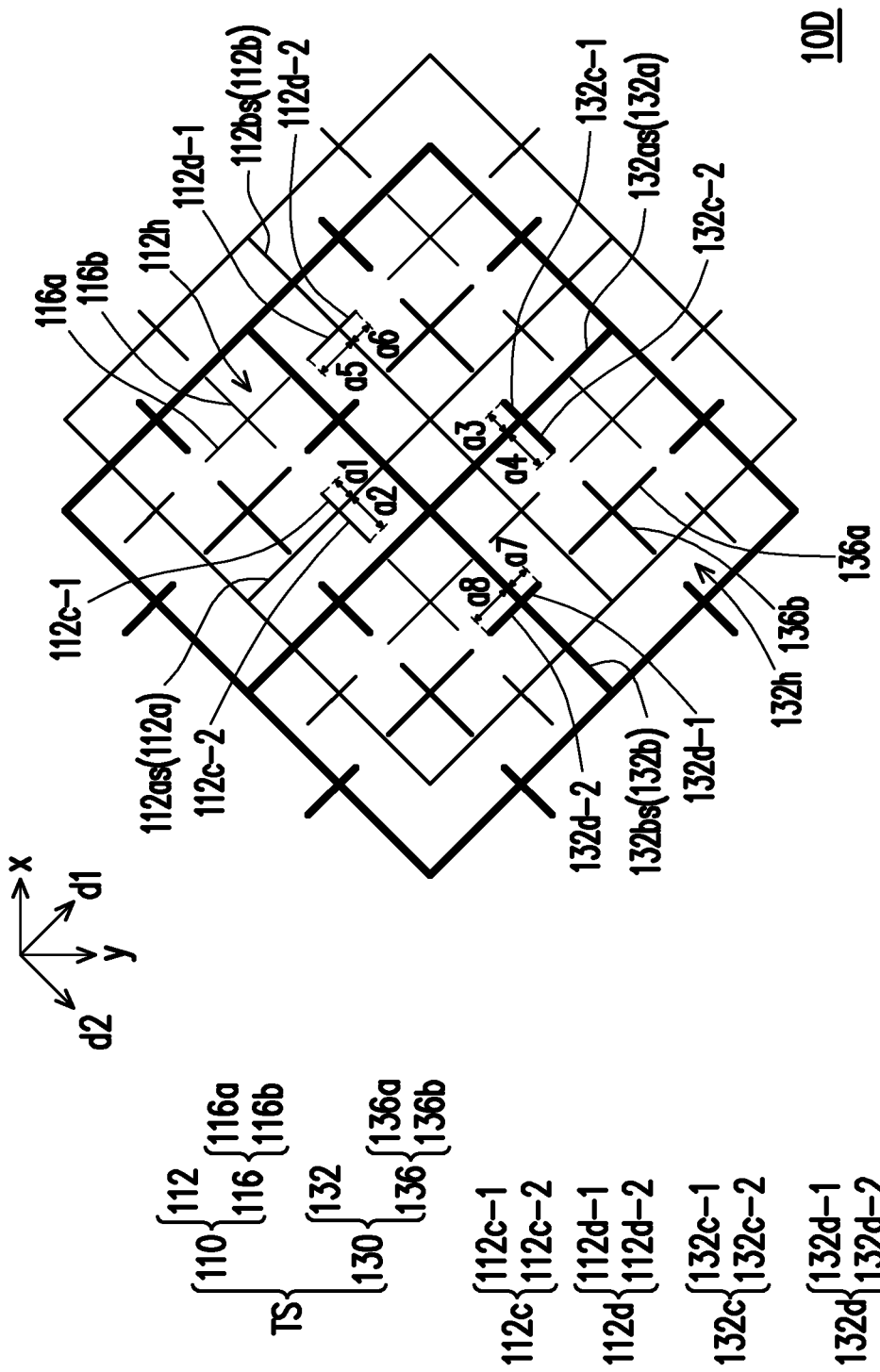
FIG. 13 is a schematic top view of a touch apparatus 10D of an embodiment of the invention.

FIG. 13 is a schematic top view of a touch apparatus 10D of an embodiment of the invention. FIG. 13 omits the first dummy electrodes and the second dummy electrodes. The touch apparatus 10D of FIG. 13 is similar to the touch apparatus 10C, and the difference between the two is: the second branches 112d and the fourth branches 132d of the touch apparatus 10D of FIG. 13 are different from the second branches 112d and the fourth branches 132d of the touch apparatus 10C.

Referring to FIG. 13, specifically, in the present embodiment, the second branches 112d of the touch apparatus 10D include a first portion 112c-1 and a second portion 112c-2 respectively located at two opposite sides of a corresponding second main portion 112b, and a length a5 of the first portion 112d-1 of the second branches 112d is different from a length a6 of the second portion 112c-2 of the second branches 112d; the fourth branches 132d of the touch apparatus 10D include a first portion 132c-1 and a second portion 132c-2 respectively located at two opposite sides of a corresponding fourth main portion 132b, and a length a7 of the first portion 132c-1 of the fourth branches 132d is different from a length a8 of the second portion 132c-2 of the fourth branches 132d. In other words, in the embodiment of the touch apparatus 10D, in addition to the first branches 112c being distributed asymmetrically with respect to the first main portion 112a and the third branches 132c being distributed asymmetrically with respect to the third main portion 132a, the second branches 112d are also distributed asymmetrically with respect to the second main portion 112b, and the fourth branches 132d are also distributed asymmetrically with respect to the fourth main portion 132b.

Figure 14:
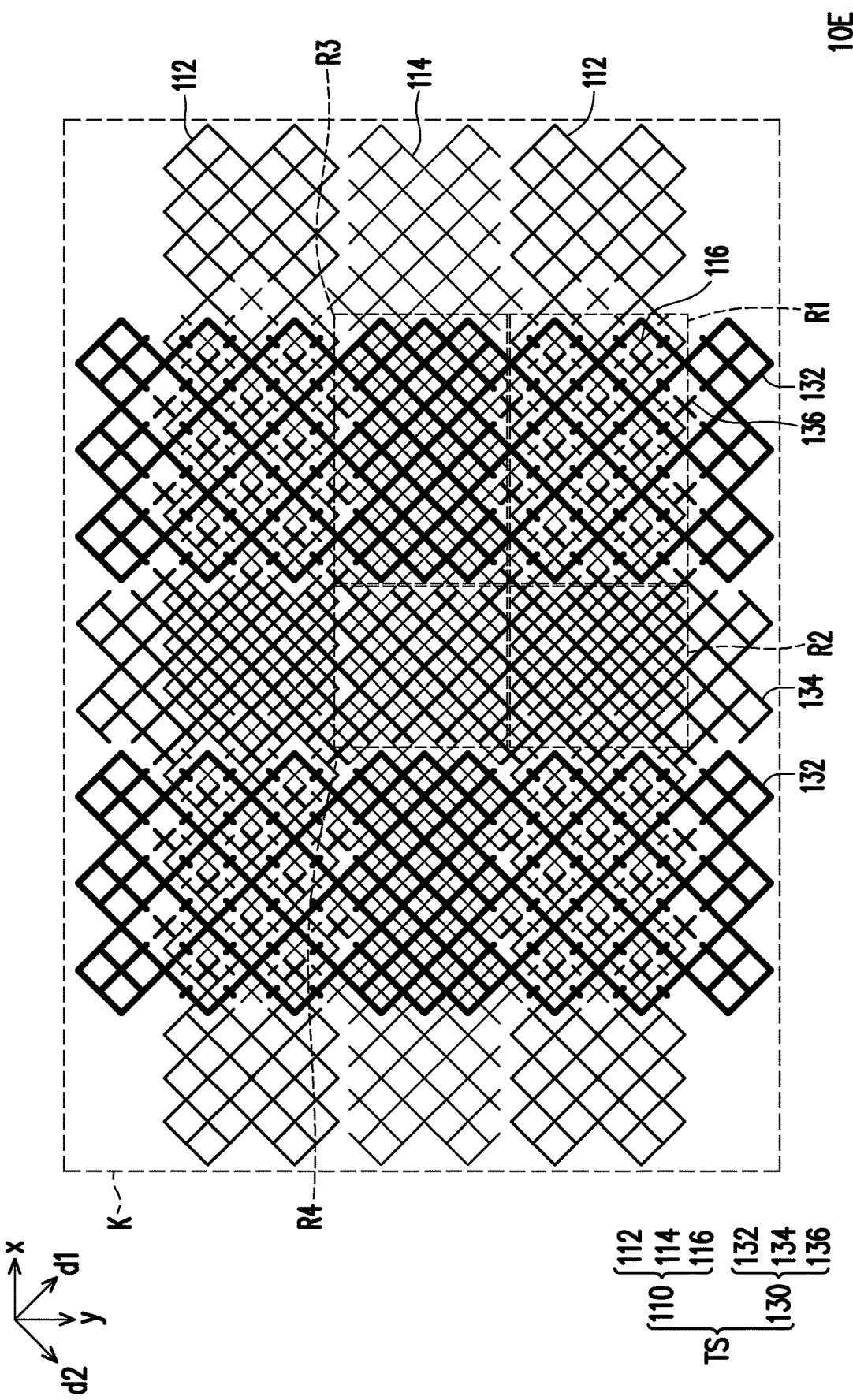
FIG. 14 is a schematic top view of a touch apparatus 10E of an embodiment of the invention.

FIG. 14 is a schematic top view of a touch apparatus 10E of an embodiment of the invention.

Figure 15:
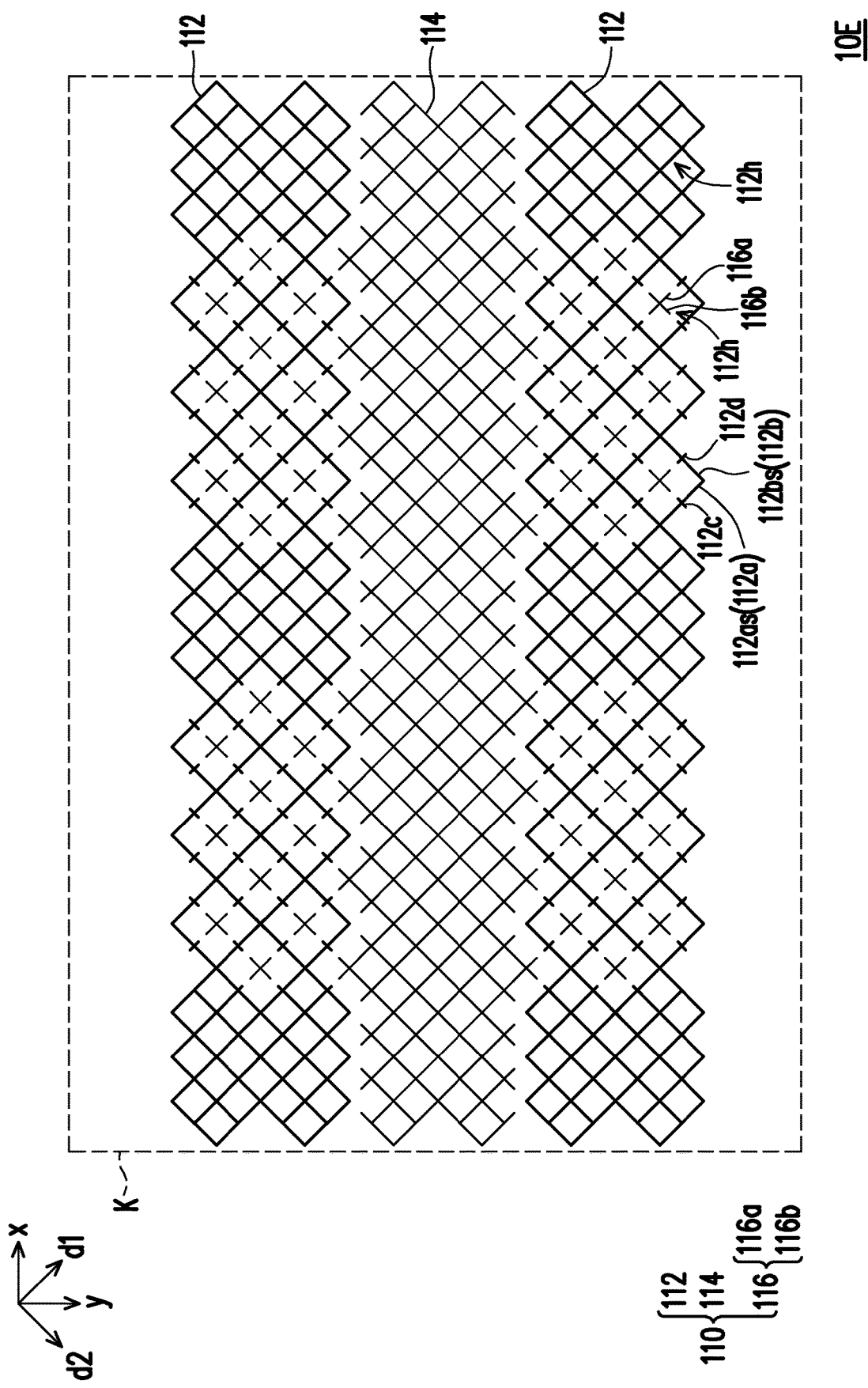
FIG. 15 shows the first conductive layer 110 of the touch device TS of the touch apparatus 10E of FIG. 14.

FIG. 15 shows the first conductive layer 110 of the touch device TS of the touch apparatus 10E of FIG. 14.

Figure 16:
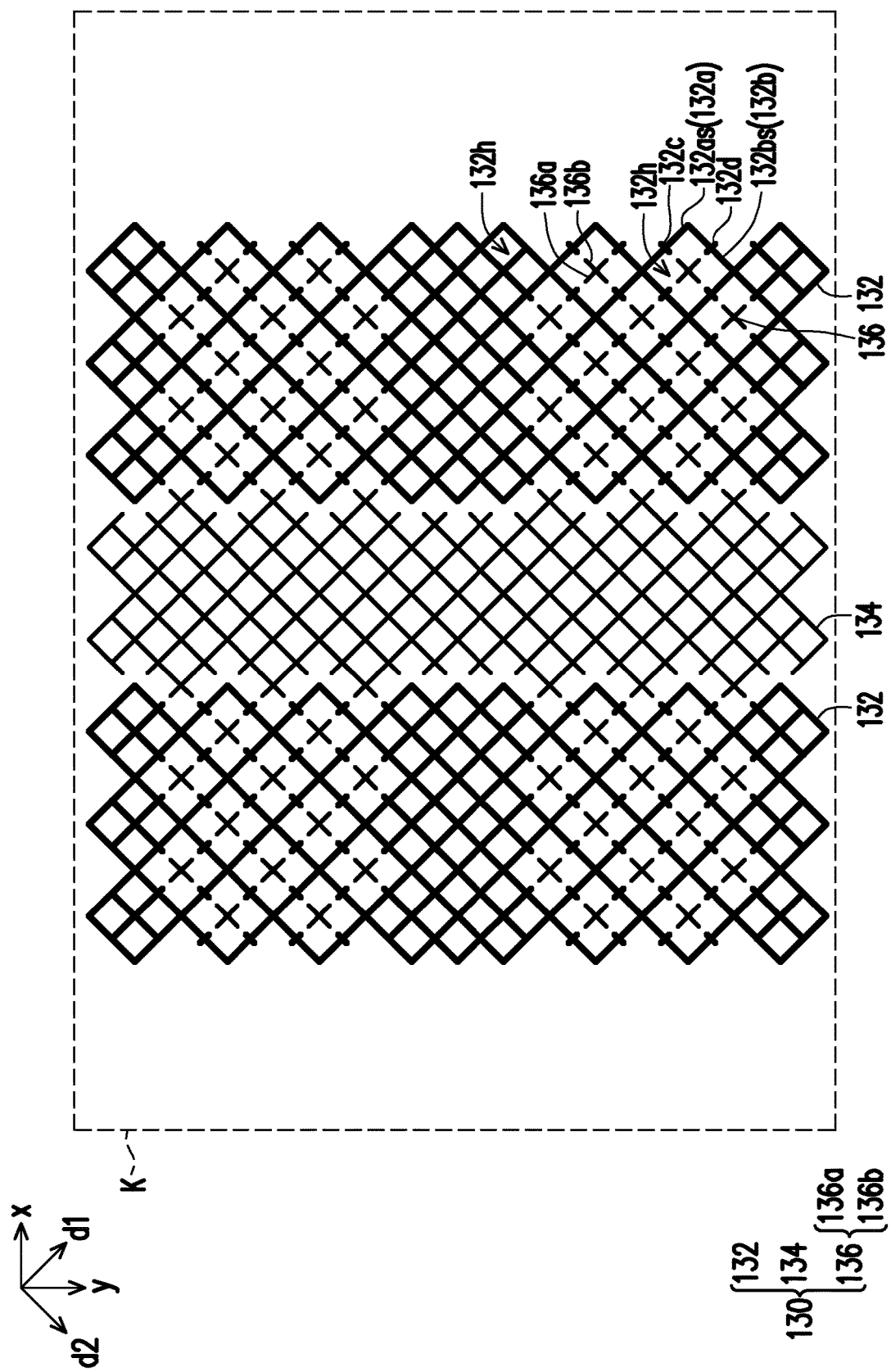
FIG. 16 shows the second conductive layer 130 of the touch device TS of the touch apparatus 10E of FIG. 14.

FIG. 16 shows the second conductive layer 130 of the touch device TS of the touch apparatus 10E of FIG. 14.

Figure 17:
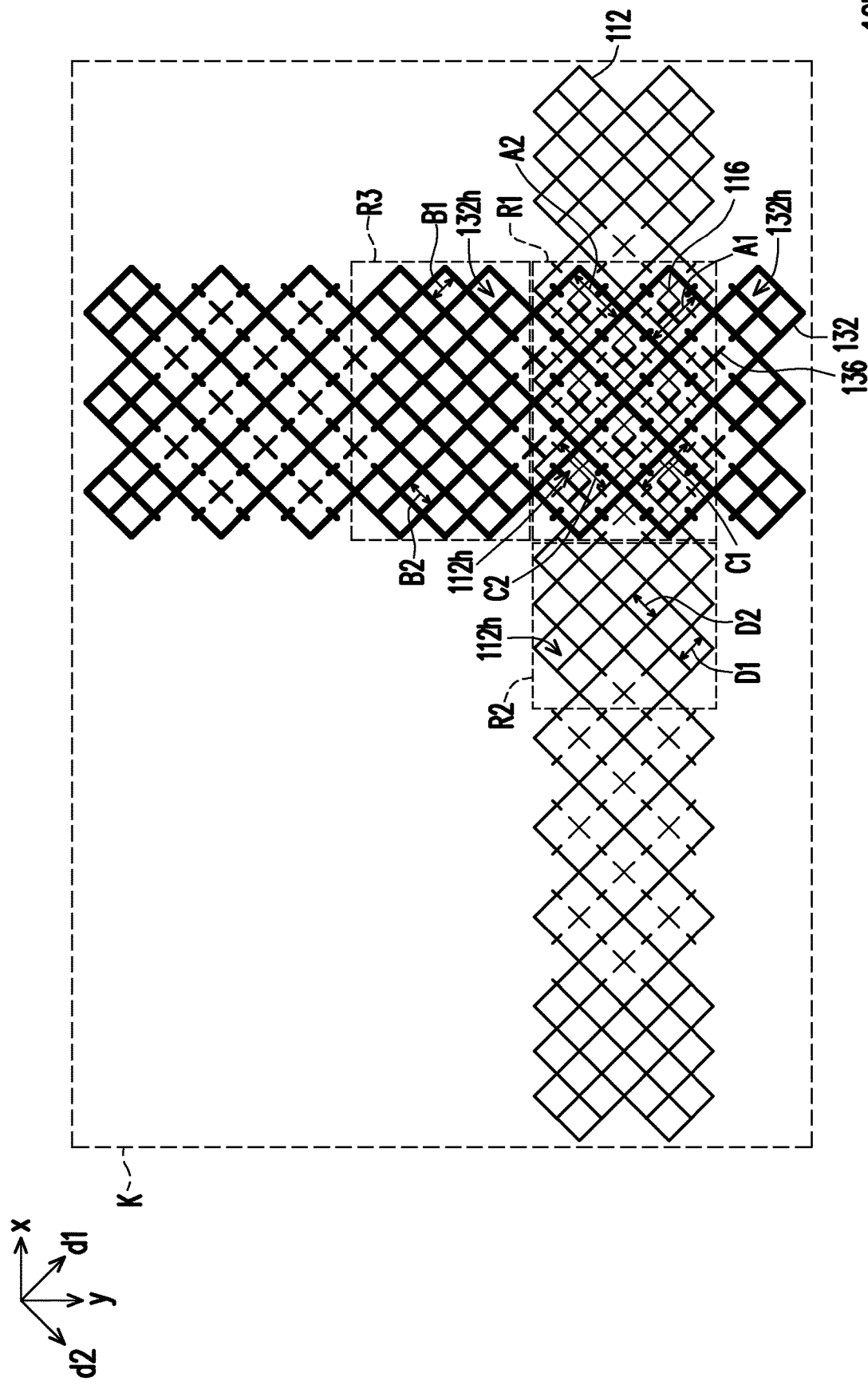
FIG. 17 shows a plurality of first dummy patterns 116, a plurality of second dummy patterns 136, and one first touch electrode 112 and one second touch electrode 132 interlaced with each other of the touch apparatus 10E of FIG. 14.

FIG. 17 shows a plurality of first dummy patterns 116, a plurality of second dummy patterns 136, and one first touch electrode 112 and one second touch electrode 132 interlaced with each other of the touch apparatus 10E of FIG. 14.

The touch apparatus 10E of FIG. 14 to FIG. 17 is similar to the touch apparatus 10 of FIG. 3 to FIG. 6, and the difference between the two is: the pattern of the first touch electrodes 112 of the touch apparatus 10E in the second interlaced regions R2 is different from the pattern of the first touch electrodes 112 of the touch apparatus 10 in the second interlaced regions R2; and the pattern of the second touch electrodes 132 of the touch apparatus 10E in the third interlaced regions R3 is different from the pattern of the second touch electrodes 132 of the touch apparatus 10 in the third interlaced regions R3.

Referring to FIG. 3 and FIG. 4, specifically, in the embodiment of the touch apparatus 10, the number density of the plurality of first grids 112h of the first touch electrodes 112 in the first interlaced regions R1 is substantially equal to the number density thereof in the second interlaced regions R2, and the plurality of first grids 112h of the first touch electrodes 112 have the same size and shape on the first interlaced regions R1 and the second interlaced regions R2.

Please refer to FIG. 14, FIG. 15, and FIG. 17, specifically, in the embodiment of the touch apparatus 10E, the number density of the plurality of first grids 112h of the first touch electrodes 112 on a second interlaced region R2 is greater than the number density thereof on a first interlaced region R1. In the embodiment of the touch apparatus 10E, a width C1 (marked in FIG. 17) of one first grid 112h on a first interlaced region R1 in the first direction d1 is greater than a width D1 (marked in FIG. 17) of one first grid 112h on a second interlaced region R2 in the first direction d1; a width C2 (marked in FIG. 17) of one first grid 112h on a first interlaced region R1 in the second direction d2 is greater than a width D2 (marked in FIG. 17) of one first grid 112*h* on a second interlaced region R2 in the second direction d2; and the area of one first grid 112*h* on a first interlaced region R1 is greater than the area of one first grid 112*h* on a second interlaced region R2.

Please refer to FIG. 14, FIG. 16, and FIG. 17, in addition, in the embodiment of the touch apparatus 10E, the number density of the plurality of second grids 132*h* of the second touch electrodes 132 on a third interlaced region R3 is greater than the number density thereof on a first interlaced region R1. In the embodiment of the touch apparatus 10E, a width A1 (marked in FIG. 17) of one second grid 132*h* on a first interlaced region R1 in the first direction d1 is greater than a width B1 (marked in FIG. 17) of one second grid 132*h* on a third interlaced region R3 in the first direction d1; a width A2 (marked in FIG. 17) of one second grid 132*h* on a first interlaced region R1 in the second direction d2 is greater than a width B2 (marked in FIG. 17) of one second grid 132*h* on a third interlaced region R3 in the second direction d2; and the area of one second grid 132*h* on a first interlaced region R1 is greater than the area of one second grid 132*h* on a third interlaced region R3.

Referring to FIG. 14, in short, in the present embodiment, the places where the first touch electrodes 112 are not interlaced with the second touch electrodes 132 (that is, the second interlaced regions R2) are metal grids with a higher density and there are no breakpoints; and the places where the second touch electrodes 132 are not interlaced with the first touch electrodes 112 (that is, the third interlaced regions R3) are metal grids with a higher density and there are no breakpoints. Therefore, the resistance of the first touch electrodes 112 is low, and the resistance of the second touch electrodes 132 is low, thus helping to reduce the RC loading of the touch apparatus 10C.

Moreover, in the present embodiment, the places where the first touch electrodes 112 are not interlaced with the second touch electrodes 132 (that is, the second interlaced regions R2) are metal grids with a higher density. The first grids 112*h* of the first touch electrodes 112 on the second interlaced regions R2 and with a higher density and the second touch electrodes 132 also form a fringe-induced electric field. The fringe-induced electric field also helps to increase the Cm % of the touch apparatus 10C.

Referring to Table 3 below, the conductance resistance values in Table 3 refer to the sum of the resistance values of all the first touch electrodes 112 and all the second touch electrodes 132 of each embodiment, and Cm %=[(Cm−Cm')/Cm]*100%, wherein Cm is the sensing capacitance of the first touch electrodes 112 and the second touch electrodes 132 when no conductive object (not shown) is disposed on the touch surface 10*a*, and Cm' is the sensing capacitance of the first touch electrodes 112 and the second touch electrodes 132 when a conductive object (not shown) is provided on the touch surface 10*a*.

Table 3 below shows various data of the touch apparatus 10 of the above embodiments and the touch apparatus 10E of the present embodiment. The data in Table 3 may prove that in the absence of visual effect issues such as moiré, compared with the touch apparatus 10 of the above embodiments, the conductive wire resistance of the touch apparatus 10E of the present embodiment is lower, thus helping to further reduce the RC loading of the touch apparatus 10E; and the Cm % of the touch apparatus 10E of the present embodiment is greater than the Cm % of the touch apparatus 10 of the above embodiments, thus helping to further improve Cm %-related performance of the touch apparatus 10E (for example, but not limited to: touch sensitivity, etc.)

TABLE 3

| | Touch apparatus 10 of embodiment | Touch apparatus 10E of embodiment |
| --- | --- | --- |
| Moiré | OK | OK |
| Number of interlaced portions of the first touch electrodes 112 and the second touch electrodes 132 | Ref. | +0% |
| Conductive wire resistance | Ref. | −8% |
| Cm % | 8.8% | 9.5% |

Figure 18:
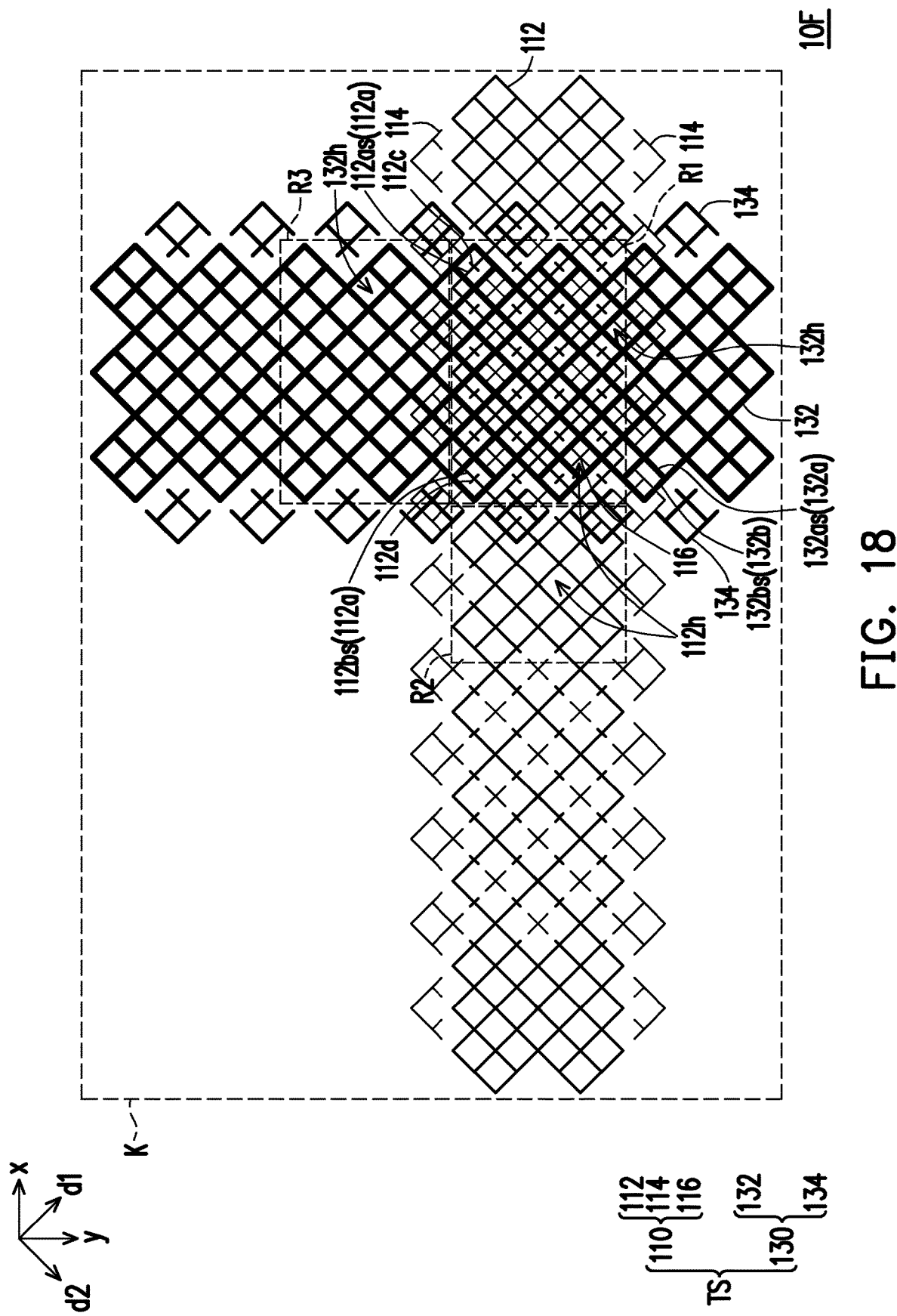
FIG. 18 is a schematic top view of a touch apparatus 10F of an embodiment of the invention.

FIG. 18 is a schematic top view of a touch apparatus 10F of an embodiment of the invention. The touch apparatus 10F of FIG. 18 is similar to the touch apparatus 10E of FIG. 14. The difference between the two is that the second conductive layer 130 of the touch apparatus 10F is different from the second conductive layer 130 of the touch apparatus 10E.

Referring to FIG. 18, specifically, in the present embodiment, the second conductive layer 130 includes the second touch electrodes 132 and the second dummy electrodes 134, but does not include the second dummy patterns 136 of the touch apparatus 10E. In addition, the number density of the second grids 132*h* of the second touch electrodes 132 of the touch apparatus 10F in the first interlaced regions R1 is substantially the same as the number density in the third interlaced regions R3. In addition, in the first interlaced regions R1, the third branches 132*c* and the fourth branches 132*d* of the touch apparatus 10E are not provided on the second grids 132*h* of the touch apparatus 10F. Moreover, in the same first interlaced regions R1, the number density of the plurality of second grids 132*h* is greater than the number density of the plurality of first grids 112*h*.

Figure 19:
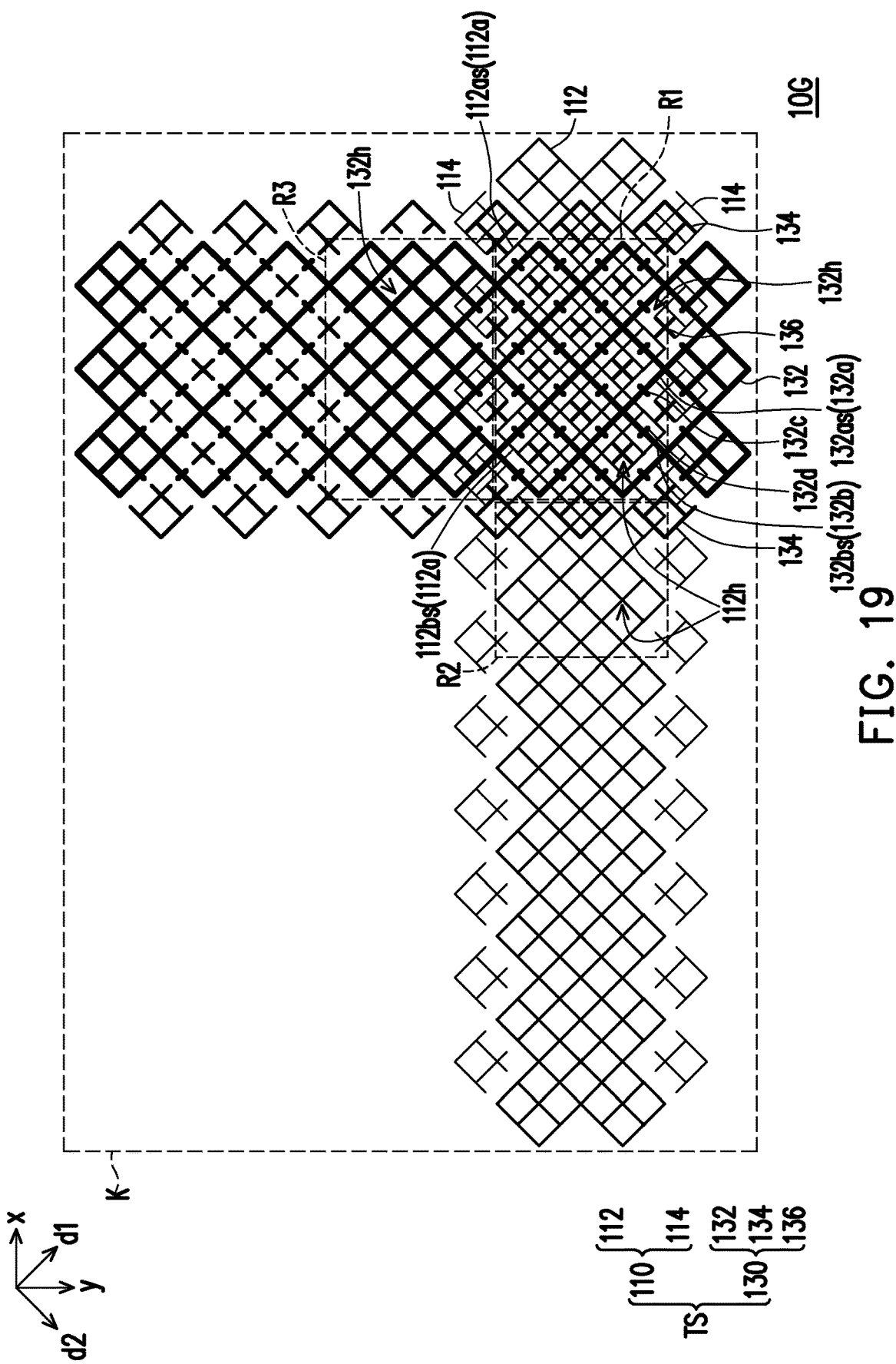
FIG. 19 is a schematic top view of a touch apparatus 10G of an embodiment of the invention.

FIG. 19 is a schematic top view of a touch apparatus 10G of an embodiment of the invention. The touch apparatus 10G of FIG. 19 is similar to the touch apparatus 10E of FIG. 14. The difference between the two is that the first conductive layer 110 of the touch apparatus 10G is different from the first conductive layer 110 of the touch apparatus 10E.

Referring to FIG. 19, specifically, in the present embodiment, the first conductive layer 110 includes the first touch electrodes 112 and the first dummy electrodes 114, but does not include the first dummy patterns 116 of the touch apparatus 10E. In addition, the number density of the first grids 112*h* of the first touch electrodes 112 of the touch apparatus 10G in the first interlaced regions R1 is substantially the same as the number density thereof in the second interlaced regions R2. In addition, in the first interlaced regions R1, the first branches 112*c* and the second branches 112*d* of the touch apparatus 10E are not provided on the first grids 112*h* of the touch apparatus 10G.

Figure 20:
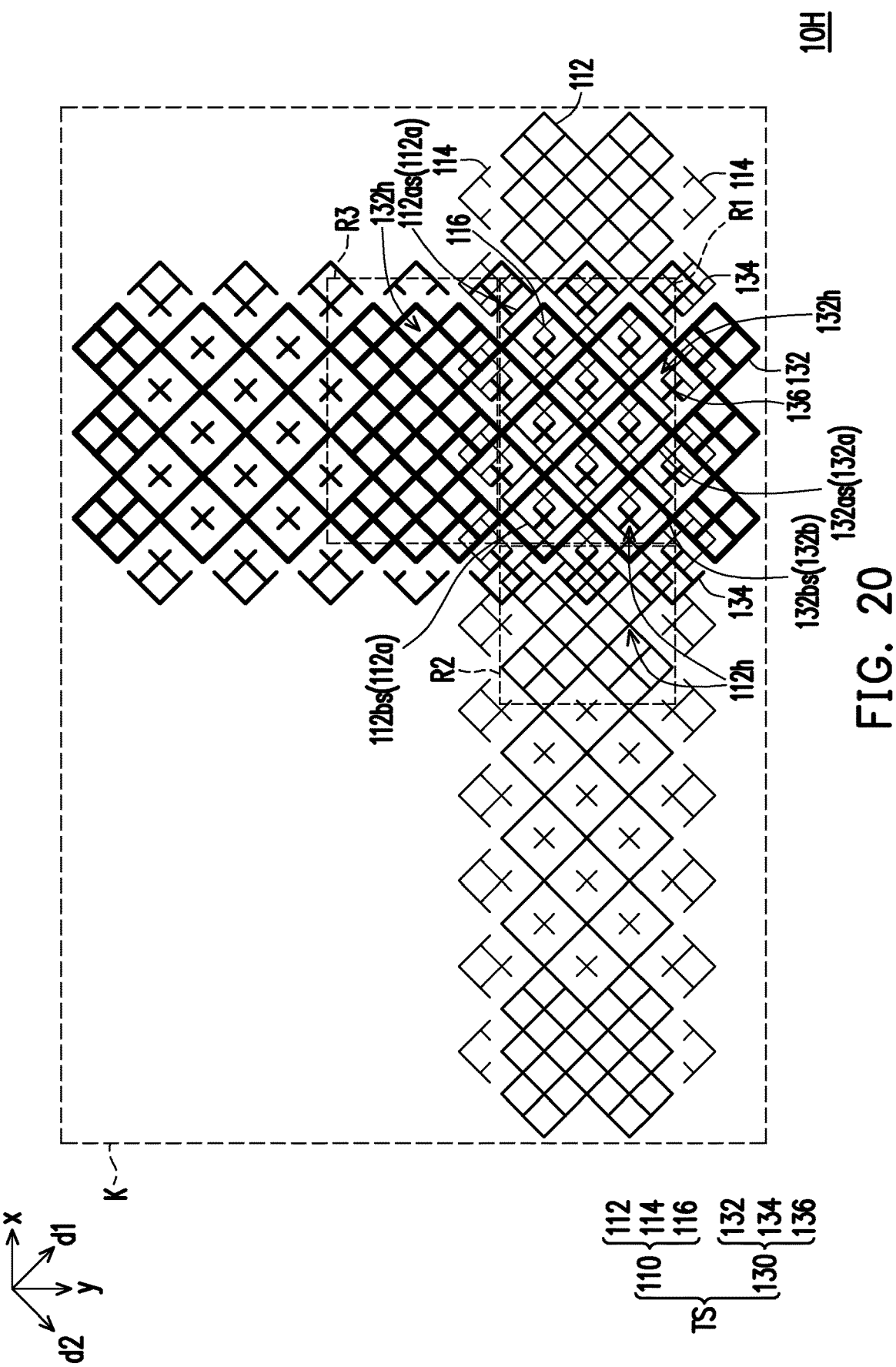
FIG. 20 is a schematic top view of a touch apparatus 10H of an embodiment of the invention.

FIG. 20 is a schematic top view of a touch apparatus 10H of an embodiment of the invention. The touch apparatus 10*h* of FIG. 20 is similar to the touch apparatus 10E of FIG. 14, and the difference between the two is: the first touch electrodes 112 of the touch apparatus 10H are different from the first touch electrodes 112 of the touch apparatus 10E; and the second touch electrodes 132 of the touch apparatus 10H are different from the second touch electrodes 132 of the touch apparatus 10E.

Please refer to FIG. 20. Specifically, in the present embodiment, the first touch electrodes 112 of the touch apparatus 10H do not have the first branches 112*c* and the second branches 112*d*; and the second touch electrodes 132 of the touch apparatus 10H do not have the third branches 132c and the fourth branches 132d.

What is claimed is:

1. A touch apparatus, comprising:
a plurality of first touch electrodes, wherein each of the first touch electrodes comprises:
   a plurality of first main portions substantially extended in a first direction;
   a plurality of second main portions substantially extended in a second direction, wherein the first direction is staggered with the second direction, the first main portions and the second main portions are crossed to form a plurality of first grids, each of the first grids is defined by two segments of two adjacent first main portions and two segments of two adjacent second main portions, and there is a distance between the two segments of the two adjacent first main portions;
   a plurality of first branches structurally separated from each other, wherein the first branches and the two segments of the two adjacent first main portions of at least one first grid of the first grids are crossed; and
   a plurality of second branches structurally separated from each other, wherein the second branches and the two segments of the two adjacent second main portions of the at least one first grid of the first grids are crossed; and
a plurality of second touch electrodes interlaced with the first touch electrodes to define a plurality of first interlaced regions;
wherein the first branches and the second branches of the first touch electrodes are located at least in the first interlaced regions;
wherein each of the second touch electrodes comprises:
   a plurality of third main portions substantially extended in the first direction;
   a plurality of fourth main portions substantially extended in the second direction, wherein the third main portions and the fourth main portions are crossed to form a plurality of second grids, and each of the second grids is defined by two segments of two adjacent third main portions and two segments of two adjacent fourth main portions, there is a distance between the two segments of the two adjacent third main portions, and the distance between the two segments of the two adjacent third main portions is less than the distance between the two segments of the two adjacent first main portions.

2. The touch apparatus of claim 1, wherein in a top view of the touch apparatus, the first branches and the second branches of each of the first touch electrodes are separated from the second touch electrodes.

3. The touch apparatus of claim 1, further comprising:
a plurality of first dummy patterns respectively disposed in the first grids and separated from the first touch electrodes, wherein each of the first dummy patterns comprises:
   a first portion arranged in the first direction with two second branches on a corresponding first grid, and structurally separated from the two second branches; and
   a second portion crossed with the first portion, arranged in the second direction with two first branches on the corresponding first grid, and structurally separated from the two first branches.

4. The touch apparatus of claim 3, wherein there is a first distance between the first portion of each of the first dummy patterns and one of the two second branches on the corresponding first grid, and there is a second distance between the second portion of each of the first dummy patterns and one of the two first branches on the corresponding first grid.

5. The touch apparatus of claim 1, wherein a first branch of a first touch electrode comprises a first portion and a second portion respectively located at two opposite sides of a corresponding first main portion, and a length of the first portion of the first branch is different from a length of the second portion of the first branch.

6. The touch apparatus of claim 1, wherein
in a same first interlaced region, a number density of the second grids is greater than a number density of the first grids.

7. The touch apparatus of claim 1, further comprising:
a plurality of first dummy electrodes, wherein each of the first dummy electrodes is disposed between two adjacent first touch electrodes; and
a plurality of second dummy electrodes, wherein each of the second dummy electrodes is disposed between two adjacent second touch electrodes;
the first touch electrodes and the second dummy electrodes are interlaced to define a plurality of second interlaced regions;
the second touch electrodes and the first dummy electrodes are interlaced to define a plurality of third interlaced regions;
a number density of the first grids on a second interlaced region is greater than a number density thereof on a first interlaced region.

8. The touch apparatus of claim 7, wherein a width of one of the first grids on the first interlaced region is greater than a width of another of the first grids on the second interlaced region.

9. The touch apparatus of claim 7, wherein in a top view of the touch apparatus, the first branches and the second branches of each of the first touch electrodes are separated from the second touch electrodes.

10. The touch apparatus of claim 7, further comprising:
a plurality of first dummy patterns respectively disposed in the first grids and separated from the first touch electrodes, wherein each of the first dummy patterns comprises:
   a first portion arranged in the first direction with two second branches on a corresponding first grid, and structurally separated from the two second branches; and
   a second portion crossed with the first portion, arranged in the second direction with two first branches on the corresponding first grid, and structurally separated from the two first branches.

* * * * *